(12) United States Patent
Wakatsuki

(10) Patent No.: US 11,438,513 B2
(45) Date of Patent: Sep. 6, 2022

(54) DRIVE CONTROL DEVICE AND DRIVE CONTROL METHOD

(71) Applicant: SONY CORPORATION, Tokyo (JP)

(72) Inventor: Masashi Wakatsuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,463

(22) PCT Filed: May 14, 2019

(86) PCT No.: PCT/JP2019/019111
§ 371 (c)(1),
(2) Date: Jan. 25, 2021

(87) PCT Pub. No.: WO2020/026557
PCT Pub. Date: Feb. 6, 2020

(65) Prior Publication Data
US 2021/0168297 A1    Jun. 3, 2021

(30) Foreign Application Priority Data

Aug. 1, 2018 (JP) .............................. JP2018-144926

(51) Int. Cl.
*H04N 5/232* (2006.01)
*G06T 7/292* (2017.01)
*G06T 7/50* (2017.01)
*G06T 7/66* (2017.01)
*G06T 7/70* (2017.01)
*H04N 5/04* (2006.01)

(52) U.S. Cl.
CPC ......... *H04N 5/23299* (2018.08); *G06T 7/292* (2017.01); *G06T 7/50* (2017.01); *G06T 7/66* (2017.01); *G06T 7/70* (2017.01); *H04N 5/04* (2013.01); *G06T 2207/30244* (2013.01)

(58) Field of Classification Search
None
See application file for complete search history.

(56) References Cited

FOREIGN PATENT DOCUMENTS

| JP | 07-226873 A | | 8/1995 |
| JP | 09-322047 A | | 12/1997 |
| JP | 1997322047 A | * | 12/1997 |
| JP | 2002-247440 A | | 8/2002 |
| JP | 2002247440 A | * | 8/2002 |
| JP | 2006-014173 A | | 1/2006 |
| JP | 2007-81754 A | | 3/2007 |
| JP | 2010-154391 A | | 7/2010 |
| JP | 2010154391 A | * | 7/2010 |
| JP | 2014-212502 A | | 11/2014 |

OTHER PUBLICATIONS

International Search Report and Written Opinion of PCT Application No. PCT/JP2019/019111 dated Jul. 23, 2019, 10 pages of ISRWO.

* cited by examiner

*Primary Examiner* — James M Anderson, II
(74) *Attorney, Agent, or Firm* — Chip Law Group

(57) ABSTRACT

Accuracy of drive control in an image capturing direction for object tracking is improved. Therefore, a drive amount in an image capturing direction for tracking an object is configured to be controlled by using object information acquired from a captured image and image-capturing-direction information corresponding to a horizontal synchronization signal used in an image capturing action.

15 Claims, 15 Drawing Sheets

ACQUIRED IMAGE

ROTATED BY 90 DEGREES

HORIZONTAL SYNCHRONIZATION SIGNAL

MOUNT ANGULAR POSITION

FIG. 12A  CALCULATE FROM PAST IMAGE (FRAME)
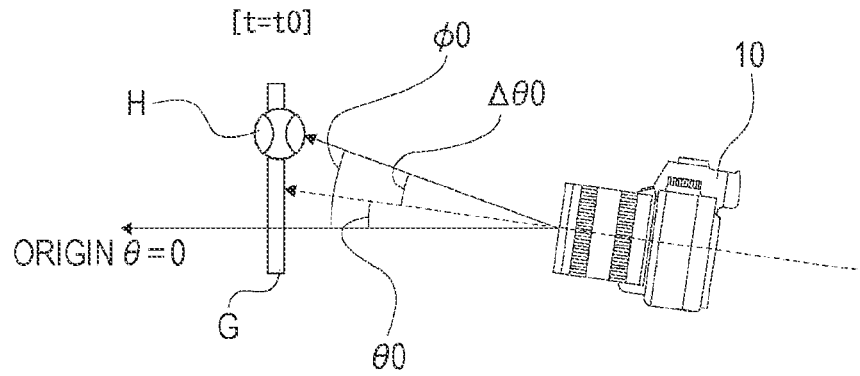
FIG. 12B  CALCULATE FROM LATEST IMAGE (FRAME)
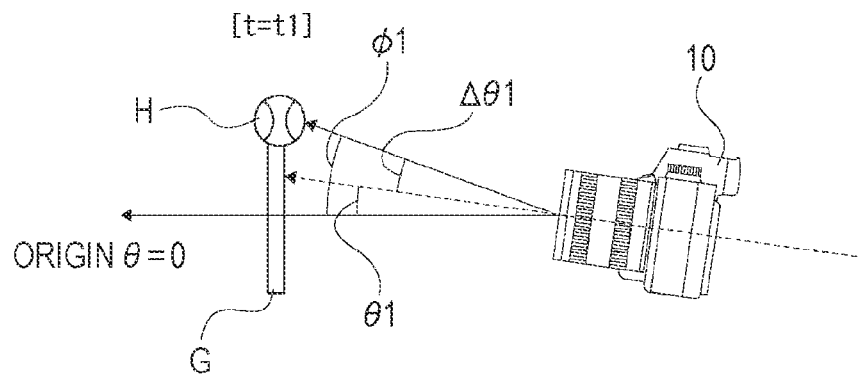
FIG. 12C  IN COMPUTATION (PRESENT POINT)
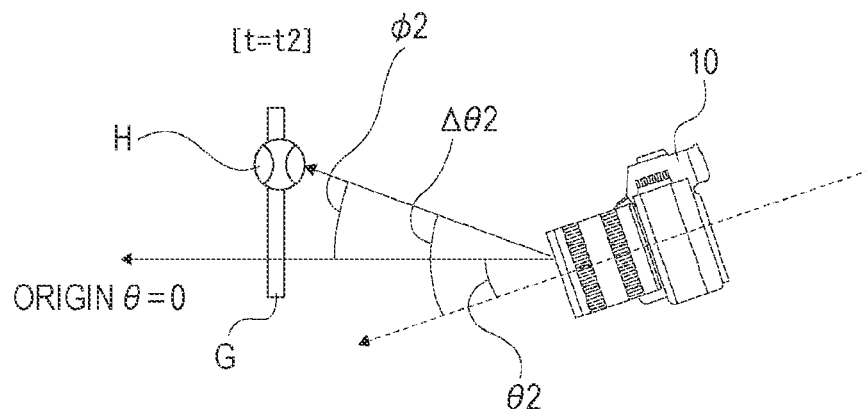

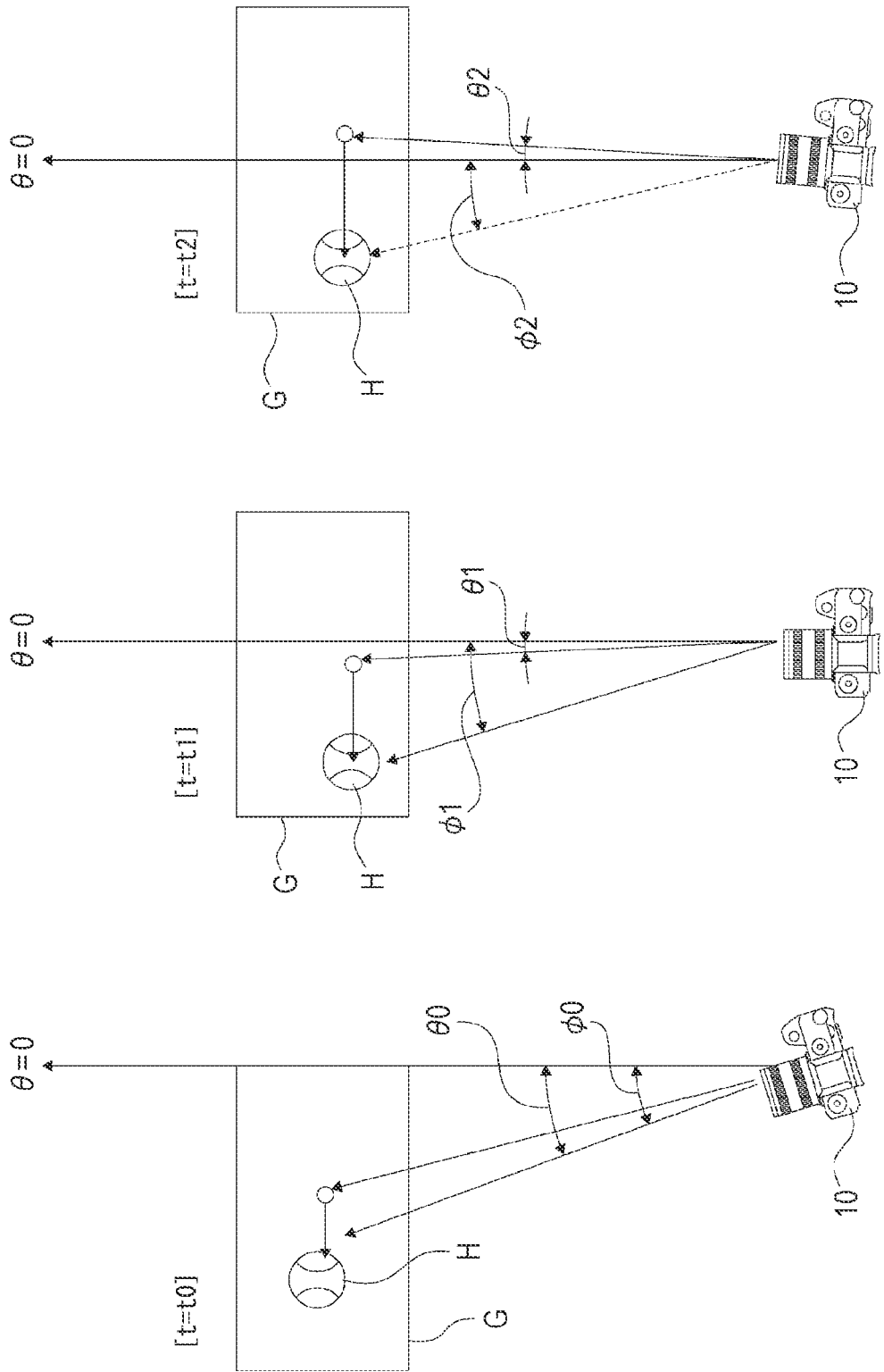

DRIVE CONTROL DEVICE AND DRIVE CONTROL METHOD

CROSS REFERENCE TO RELATED APPLICATIONS

This application is a U.S. National Phase of International Patent Application No. PCT/JP2019/019111 filed on May 14, 2019, which claims priority benefit of Japanese Patent Application No. JP 2018-144926 filed in the Japan Patent Office on Aug. 1, 2018. Each of the above-referenced applications is hereby incorporated herein by reference in its entirety.

TECHNICAL FIELD

The present technology relates to a drive control device, a drive control method, and a program and particularly relates to a technology field for object tracking in image capturing.

BACKGROUND ART

A technology to track a particular object in image capturing by an image capturing device is known.

Below described Patent Documents 1, 2 disclose technologies of a case where automatic tracking is carried out in a system in which an image capturing device is attached to a mount to displace an image capturing direction by actions of the mount.

CITATION LIST

Patent Document

Patent Document 1: Japanese Patent Application Laid-Open No. 2007-81754
Patent Document 2: Japanese Patent Application Laid-Open No. H7-226873

SUMMARY OF THE INVENTION

Problems to be Solved by the Invention

In recent years, improvement in tracking performance has been required, and, for example, there is a demand to enable image capturing with appropriate tracking with respect to an object which moves at high speed.

As the technology of automatic tracking, it is expected to obtain position information of an object serving as a tracking target in a captured image and carry out control so that the object is configured to be at a predetermined position in the image. However, actually, due to a temporal difference between position detection timing of the object from the captured image and timing (exposure timing) at which the object is actually captured to be at the in-image position, precise object position detection cannot be carried out. Particularly, in a case of a high-speed object, this position detection error largely affects tracking accuracy.

An image capturing device using a complementary metal oxide semiconductor (CMOS) sensor, which is a current mainstream, sequentially carries out exposure and reading at every reading line. As a result, object images of the time which is different at every line are recorded even in an image of one frame. For example, if images are captured while the mount circles, pointed directions are different at every line of the images.

In a mount system which carries out actions at high speed, a direction at which the mount is pointing (image capturing direction) has to be precisely perceived at the timing at which the object in the image is subjected to exposure in order to ensure tracking performance and tracking accuracy.

Therefore, it is an object of the present technology to enable acquisition of the information indicating the image capturing direction in coordination with the exposure timing of the object serving as the tracking target to improve the tracking performance.

Solutions to Problems

A drive control device according to the present technology includes a drive control unit configured to control a drive amount in an image capturing direction for tracking an object on the basis of object information acquired from a captured image and image-capturing-direction information corresponding to a horizontal synchronization signal used in an image capturing action.

The object information in the captured image is, for example, information about the object serving as a tracking target obtained by analysis of the captured image and is, for example, position information indicating a pixel at which the tracking target object is captured in the image. The image-capturing-direction information is, for example, the information indicating the image capturing direction of the image capturing device moved by the mount.

In the case of the rolling shutter style, in consideration of facts that the exposure start time is shifted at every line in the image and that exposure is carried out only for a time length defined by the shutter speed, the image-capturing-direction information is acquired in coordination with the timing of the horizontal synchronization signal so that the image-capturing-direction information corresponding to the point of time of exposure of the object in the captured image is obtained.

By virtue of this, the image-capturing-direction information of required timing such as the exposure timing of the object can be acquired.

In the drive control device according to the above described present technology, it is conceivable that the object information includes position information of a tracking-target object in the captured image.

More specifically, the position information of the tracking-target object captured in the captured image is configured to be used in drive control.

In the drive control device according to the above described present technology, it is conceivable that the image-capturing-direction information is information of the image capturing direction acquired on the basis of the horizontal synchronization signal of a particular line corresponding to position information of a tracking-target object included in the object information among a line of an image signal of the captured image.

For example, the image-capturing-direction information obtained at the timing defined by the horizontal synchronization signal of the line in which the tracking-target object is captured in the captured image is configured to be used in drive control for tracking.

In the drive control device according to the above described present technology, it is conceivable that the position information of the tracking-target object is information of a gravity center position based on a shape of the tracking-target object in the captured image.

In the captured image, the tracking-target object is captured in a range across a plurality of pixels. Therefore, the gravity center position of this pixel range, in other words, the captured shape of the object is obtained and used as the position information of the tracking-target object.

In the drive control device according to the above described present technology, it is conceivable that the image-capturing-direction information is information of the image capturing direction based on time of exposure start and exposure end of a particular line corresponding to the position information included in the object information among a line of an image signal of the captured image.

For example, as the information of the particular time within the time from the exposure start to the exposure end of the particular line in which the tracking-target object is captured in the captured image, the information of the image capturing direction acquired at the timing defined by the horizontal synchronization signal is configured to be used in the drive control for tracking.

In the drive control device according to the above described present technology, it is conceivable that the image-capturing-direction information is information of the image capturing direction of intermediate time of exposure start time and exposure end time of the particular line.

More specifically, the information of the image capturing direction of intermediate time within the time from the exposure start to the exposure end of the particular line in which the tracking-target object is captured in the captured image is configured to be used in the drive control for tracking.

In the drive control device according to the above described present technology, it is conceivable that the object information includes position information of a tracking-target object acquired from the captured image, and the drive control unit controls the drive amount in the image capturing direction for tracking the tracking-target object on the basis of the position information and the image-capturing-direction information corresponding to the position information.

For example, the timing corresponding to the position information of the tracking-target object has high accuracy as the image-capturing-direction information of the case in which the tracking-target object is captured in the captured image.

In the drive control device according to the above described present technology, it is conceivable that the object information includes position information of a tracking-target object acquired from the captured image, and the drive control unit controls the drive amount in the image capturing direction for tracking the tracking-target object on the basis of the position information, the image-capturing-direction information corresponding to the position information, and the image-capturing-direction information corresponding to drive control in the image capturing direction.

The image-capturing-direction information corresponding to the drive control is, for example, image-capturing-direction information or the like of the timing at which some sort of processing about drive control is executed. This drive control timing is, for example, the timing at which the drive amount is ordered to control the image capturing direction after exposure of the captured image, acquisition of a frame as an exposed image, and completion of analysis thereof. Then, the image-capturing-direction information of the timing corresponding to the position information of the tracking-target object in the captured image is already the object position and the image capturing direction information of the past at the drive control timing at which drive control is actually carried out.

Therefore, the difference (the drive amount to be controlled (including the drive direction expressed by positive/negative)) at a past point of time can be obtained in a state free from a time lag if the position information of the tracking-target object and the image-capturing-direction information are used. However, at the point of time of control, displacement (change in the image capturing direction or movement of the tracking-target object) may have already caused. Therefore, the image-capturing-direction information corresponding to the drive control is also used.

In the drive control device according to the above described present technology, it is conceivable that the object information includes position information of a tracking-target object acquired from the captured image, and the drive control unit controls the drive amount in the image capturing direction for tracking the tracking-target object by using first position information of the tracking-target object corresponding to first timing, first image-capturing-direction information corresponding to the first position information, second position information of the tracking-target object corresponding to second timing different from the first timing, second image-capturing-direction information corresponding to the second position information, and image-capturing-direction information acquired at drive control timing in the image capturing direction.

According to the position information and the image-capturing-direction information of first and second timing, a position of the tracking-target object at a certain point of time can be predicted.

Particularly, it is conceivable that the first timing is past timing of the second timing.

The position of the tracking-target object at a certain past point of time can be found out from the first position information and the first image-capturing-direction information about the captured image of a past frame. Also, the position of the tracking-target object at a point of time close to the present can be found out from the second position information and the second image-capturing-direction information about the latest captured image. As a result, the position of the tracking-target object of the drive control timing can be predicted.

In the drive control device according to the above described present technology, it is conceivable that the drive control unit controls the drive amount in the image capturing direction so that a tracking-target object is positioned near a center in a captured image.

The drive control for tracking changes the image capturing direction so that the tracking-target object is always positioned near the center of the captured image.

In the drive control device according to the above described present technology, it is conceivable that the object information and the image-capturing-direction information is information based on the captured image acquired from a first image capturing device, and the drive control unit controls the drive amount in the image capturing direction for tracking the object on the basis of parallax information of the first image capturing device and a second image capturing device different from the first image capturing device.

For example, separately from the image capturing device for recorded images which carries out original image capturing (image capturing for image recording), a tracking image-capturing device is provided in some cases in order to detect the tracking-target object. In such a case, the position of the tracking-target object in the captured image of the tracking image-capturing device and the image-capturing-direction information of the timing corresponding to that position can be used. However, in that case, parallax between the image capturing device for recorded images and the tracking image-capturing device has influence. Specifically, the position of the tracking-target object in the captured image taken by the image capturing device for recorded images becomes a state with an offset corresponding to the parallax. Then, control that also reflects the parallax information is carried out.

In the drive control device according to the above described present technology, it is conceivable that the drive control unit includes a tracking-target acquisition unit configured to extract a position and a shape of a tracking-target object in the captured image, a gravity-center-position computation unit configured to determine a particular line corresponding to a gravity center position based on the position and the shape of the tracking-target object from among a line of an image signal of the captured image, a representative-time acquisition unit configured to acquire time at which the particular line is subjected to exposure and determine representative time, an image-capturing-direction acquisition unit configured to acquire the image-capturing-direction information of the representative time, and a drive-amount computation unit configured to obtain the drive amount in the image capturing direction for tracking the tracking-target object by using the image-capturing-direction information and the gravity center position.

By virtue of this configuration, the image-capturing-direction information and the position (gravity center position) of the tracking-target object at the timing of the representative time are obtained so that the deviation used in tracking control is obtained in a state free from a shift in terms of the temporal axis.

In the drive control device according to the above described present technology, it is conceivable that the image-capturing-direction information is angular position information of a mount configured to change the image capturing direction of an image capturing device.

More specifically, in a case in which the image capturing device is mounted on the mount so as to be applied to tracking control in a system which varies the image capturing direction, the angular position information of the mount indicates the image capturing direction of the image capturing device.

A drive control method according to the present technology is a drive control method, in which an information processing device controls a drive amount in an image capturing direction for tracking an object on the basis of object information acquired from a captured image and image-capturing-direction information corresponding to a horizontal synchronization signal used in an image capturing action.

The image-capturing-direction information corresponding to the exposure timing or the like of the object is configured to be obtained by acquiring the image-capturing-direction information at the timing on the basis of the horizontal synchronization signal.

A program according to the present technology is a program configured to cause an information processing device to execute processing of controlling a drive amount in an image capturing direction for tracking an object on the basis of object information acquired from a captured image and image-capturing-direction information corresponding to a horizontal synchronization signal used in an image capturing action.

By virtue of this, the drive control device having high tracking performance can be widely provided by using the information processing device.

Effects of the Invention

According to the present technology, since the image capturing direction corresponding to the position of the tracking-target object can be precisely obtained, improvement in tracking accuracy and tracking performance with respect to a high-speed object can be facilitated in automatic tracking control.

Note that the effects described herein are not necessarily limitative, and any of the effects described in the present disclosure may be exerted.

BRIEF DESCRIPTION OF DRAWINGS

FIGS. 12A, 12B, and 12C are explanatory diagrams of the tracking control of the third embodiment.

FIGS. 13A, 13B, and 13C are explanatory diagrams of the tracking control of the third embodiment.

MODE FOR CARRYING OUT THE INVENTION

Hereinafter, embodiments will be described in a following order.

<1. Device Configuration Example>
<2. Action Outline>
<3. First Embodiment>
<4. Second Embodiment>
<5. Third Embodiment>
<6. Fourth Embodiment>
<7. Fifth Embodiment>
<8. Digest and Modification Examples>

1. Device Configuration Example

Figure 1A:
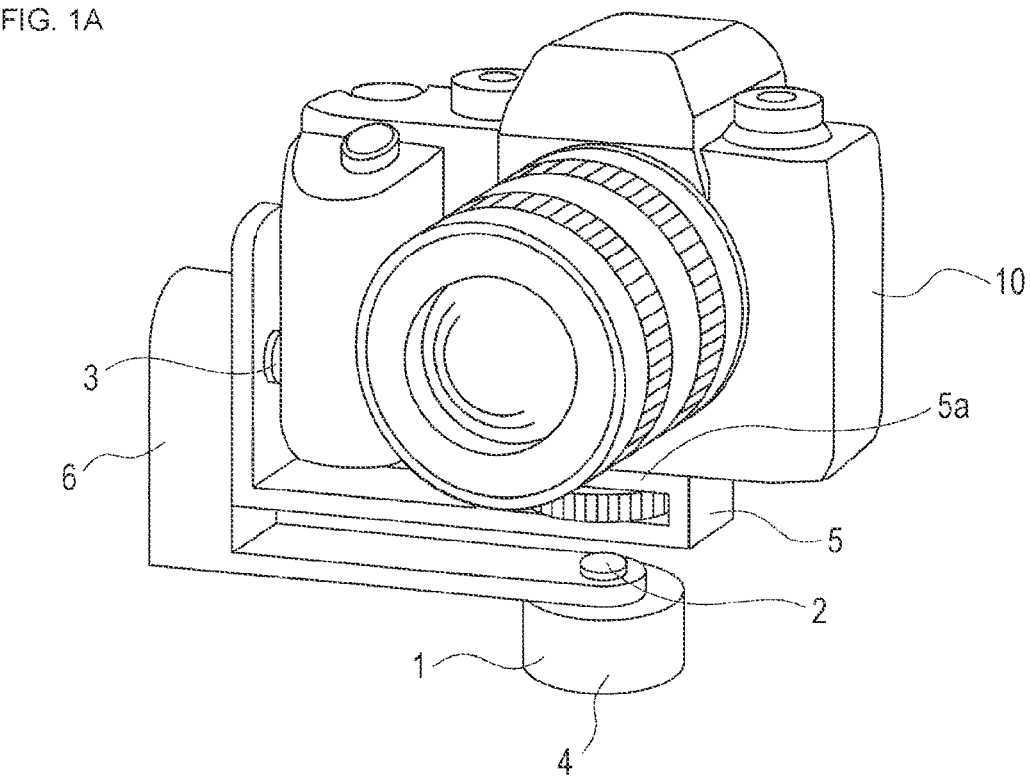
FIGS. 1A and 1B are explanatory diagrams of an image capturing device and a mount of an embodiment of a present technology.
Figure 1B:
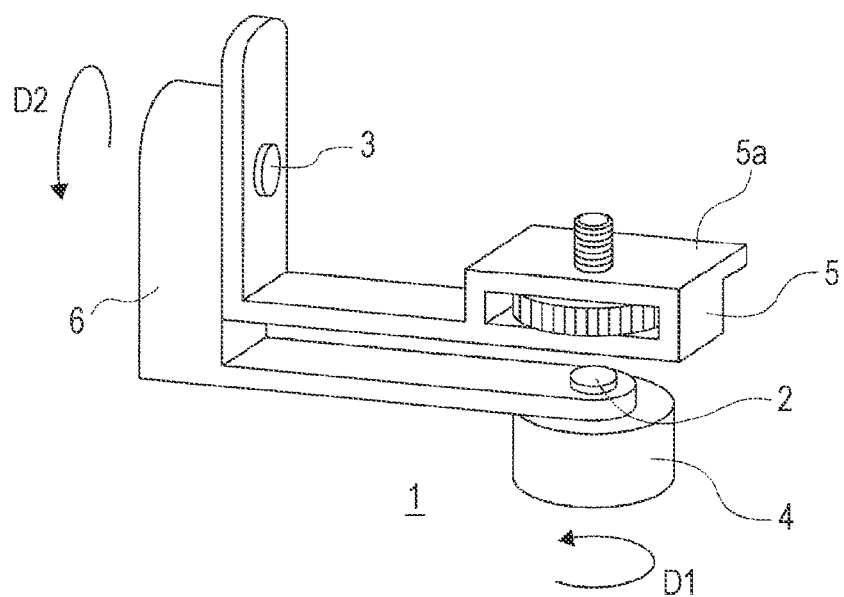

As an image capturing system provided with a drive control device of an embodiment, an image capturing device 10 and a mount 1 are shown in FIGS. 1A and 1B. The image capturing system is assumed to displace an image capturing direction of the image capturing device 10 by a rotary action of the mount 1 in a state in which the image capturing device 10 is mounted on the mount 1. An object serving as a tracking target is automatically tracked particularly since the drive control device built in (or separated from) either the image capturing device 10 or the mount 1 is provided.

Note that the "image capturing direction" is a direction corresponding to an orientation, in which the image capturing device 10 captures an image, and refers to a frontal direction (direction directed toward an object side) in an optical axis of an image-capturing optical system of the image capturing device. "Image-capturing-direction information" is information indicating such an image capturing direction. In a case of a system like FIGS. 1A and 1B, angular position information of turning of the mount 1 (referred to as "mount angular position" for explanation) corresponds to the image-capturing-direction information since the image capturing direction is displaced depending on a rotation angular position of the mount 1.

FIG. 1A shows a state in which the image capturing device 10 is attached to the mount 1, and FIG. 1B only shows the mount 1.

The mount 1 is provided with a turning shaft part 2 for turning in a yaw direction D1, a turning shaft part 3 for turning in a pitch direction D2, a base part 4, an attachment part 5, and a arm part 6.

The attachment part 5 is, for example, an L-shaped member, and an upper surface of a bottom part thereof is provided with a joint mechanism 5a corresponding to an unillustrated mechanism formed on a bottom part of the image capturing device 10 so that the image capturing device 10 can be fixed as shown in FIG. 1A.

This attachment part 5 is installed to the arm part 6 via the turning shaft part 3 so that the attachment part 5 can be turned in the pitch direction D2 with respect to the arm part 6.

The arm part 6 is, for example, an L-shaped member and is installed to the base part 4 in a turning-shaft-part-2 side. By virtue of this, the arm part 6 (and the attachment part 5 coupled to the arm part) can be turned in the yaw direction.

By using, for example, the mount 1 like this, the image capturing device 10 can displace the image capturing direction in the yaw direction and the pitch direction. By virtue of this, the object can be automatically tracked.

Note that the mount 1 has a two-shaft configuration and can be turned in the yaw direction and the pitch direction in this example of FIGS. 1A and 1B, but may have a three-shaft configuration so that it can be turned in the yaw direction, the pitch direction, and a roll direction. Furthermore, the mount 1 that has a single-shaft configuration and can be turned only in the yaw direction, only in the pitch direction, or only in the roll direction can be also applied to the embodiment.

Figure 2:
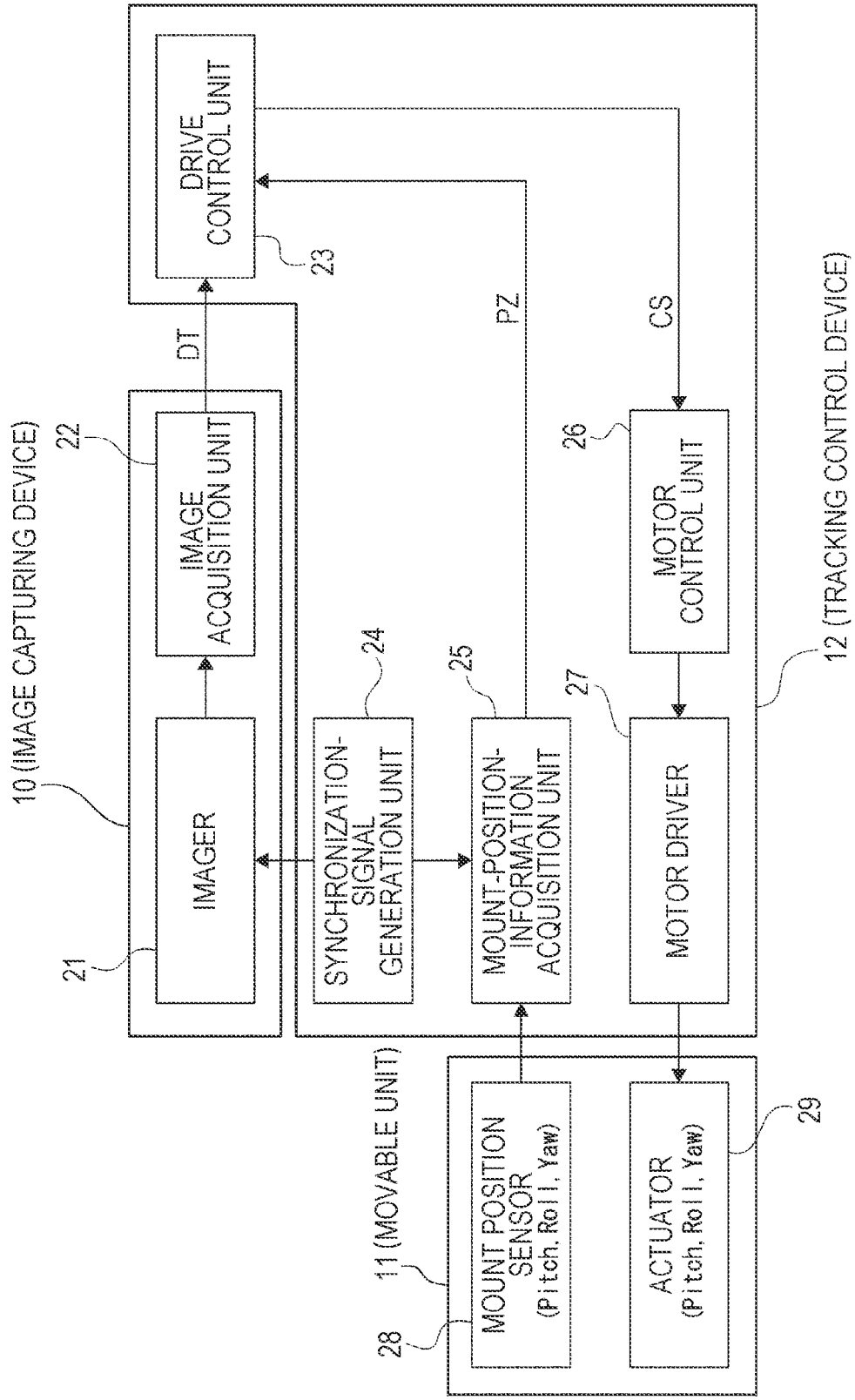
FIG. 2 is a block diagram of a main part related to tracking control of the embodiment.

A configuration of a main part of the image capturing system using, for example, the mount 1 and the image capturing device 10 like this is shown in FIG. 2. The main part referred to herein is a part related to an object tracking function.

FIG. 2 shows constituent units separately in the image capturing device 10, a movable unit 11, and a tracking control device 12. Herein, the image capturing device 10 means an image capturing device attached to the mount 1 like FIG. 1A. Also, the movable unit 11 means a segment built in the mount 1.

The tracking control device 12 is expected to be provided in the mount 1, but is not necessarily limited thereto, and various examples are conceivable. For example, the tracking control device 12 is provided in the image capturing device 10 in some cases. Furthermore, it is also conceivable to configure the tracking control device 12 to be separated from the image capturing device 10 and the mount 1.

Also, FIG. 2 shows an imager 21, an image acquisition unit 22, a drive control unit 23, a synchronization-signal generation unit 24, a mount-position-information acquisition unit 25, a motor control unit 26, a motor driver 27, a mount position sensor 28, and an actuator(s) 29.

These constituent units are shown within groups as the image capturing device 10, the movable unit 11, and the tracking control device 12, but such groups of units are examples (other examples will be described later with FIGS. 3A, 3B, and 3C).

The image capturing device 10 is a so-called digital camera and is a device which can capture images of objects, record image data serving as still images or moving images in a recording medium, and transmit the data to an external device.

The imager 21 represents an image capturing element provided in the image capturing device 10 like this.

The imager 21 receives object light, which has entered via an unillustrated image-capturing optical system, coverts the light to an electric signal, and outputs the signal. The imager 21 uses, for example, a CMOS sensor. Moreover, in this case, actions of a rolling shutter style (line exposure sequential reading) are carried out as exposure and charge reading actions.

The imager 21 carries out the exposure and reading actions of each of pixels at timing based on horizontal synchronization signals and vertical synchronization signals supplied from the synchronization-signal generation unit 24.

With respect to the electric signal obtained by subjecting the received light to photoelectric conversion, the imager 21 executes, for example, correlated double sampling (CDS) processing, automatic gain control (AGC) processing, etc. and further carries out analog/digital (A/D) conversion processing. Then, an image signal as digital data is supplied to the subsequent image acquisition unit 22.

The image acquisition unit 22 is configured to be an image processing processor, for example, by a digital signal processor (DSP) or the like.

The image acquisition unit 22 subjects the digital signal (image signal) from the imager 21 to various signal processing. For example, the image acquisition unit 22 carries out preprocessing, demosaicing, YC generation processing, resolution conversion processing, etc.

The image signal, which has been subjected to various processing by the image acquisition unit 22, is supplied to an unillustrated recording unit and subjected to recording processing, is recorded as an image file in a recording medium such as a memory card, and/or is supplied to an unillustrated communication unit, subjected to encoding processing for communication, and is transmitted to external equipment.

An image signal DT of each frame processed (or in a processing process) by the image acquisition unit 22 is supplied to the drive control unit 23. The drive control unit 23 carries out image analysis of specifying a tracking-target object and calculates a drive amount(s) required for tracking control. Processing of the drive control unit 23 will be described later.

The synchronization-signal generation unit 24 generates the horizontal synchronization signals and the vertical synchronization signals for actions of the imager 21 and outputs the signals to the imager 21.

Also, the synchronization-signal generation unit 24 supplies the horizontal synchronization signals and the vertical synchronization signals also to the mount-position-information acquisition unit 25.

The mount position sensor 28 detects information of a mount angular position as a turning angle of the mount 1. For example, in a case of the mount 1 with two shafts in the yaw direction and the pitch direction as shown in FIG. 1B, a mount angular position in the yaw direction and a mount angular position in the pitch direction are detected. As a matter of course, in a case of the mount 1 with three shafts, a mount angular position in the roll direction is also detected in addition.

The mount position sensor 28 like this is realized, for example, as rotary encoders provided in the rotary shaft parts 2, 3 of the mount 1.

The mount-position-information acquisition unit 25 acquires the mount angular position(s) detected by the mount position sensor 28 in synchronization with the horizontal synchronization signal from the synchronization-signal generation unit 24.

For example, in a case of a two-shaft structure like FIG. 1B, the information of the mount angular position is a yaw-direction angular position and a pitch-direction angular position. In a case of a three-shaft structure, it is information of a yaw-direction angular position, a pitch-direction angular position, and a roll-direction angular position.

Since the vertical synchronization signals and the horizontal synchronization signals are supplied to the mount-position-information acquisition unit 25, the mount angular position can be acquired, for example, so as to correspond to each line of each frame of the image signal.

The mount-position-information acquisition unit 25 stores, for a certain period, the information of the mount angular positions sequentially acquired at timing of every horizontal synchronization signal so that the drive control unit 23 can reference the information as image-capturing-direction information PZ of required point of time.

The drive amounts in the yaw direction and the pitch direction (in the case of the two-shaft structure. In the case of the three-shaft structure, the drive amount in the roll direction in addition) calculated by the drive control unit 23 are supplied to the motor control unit 26 as a drive control signal CS.

The motor control unit 26 drives the motor driver 27 in accordance with the supplied drive amounts and causes drive of the actuator 29 to be executed.

As the actuator 29, a yaw-direction actuator, which carries out turning of the turning shaft part 2, and a pitch-direction actuator, which carries out turning of the turning shaft part 3, are provided in the mount 1. In the case of the three-shaft structure, a roll-direction actuator is further provided.

Since each of these actuators 29 is driven by the motor control unit 26 and the motor driver 27, the image capturing direction of the image capturing device 10 is variably controlled in accordance with control amounts calculated by the drive control unit 23.

Meanwhile, as described before, the grouping of the image capturing device 10, the movable unit 11, and the tracking control device 12 about the constituent units of FIG. 2 described above is an example.

Figure 3A:
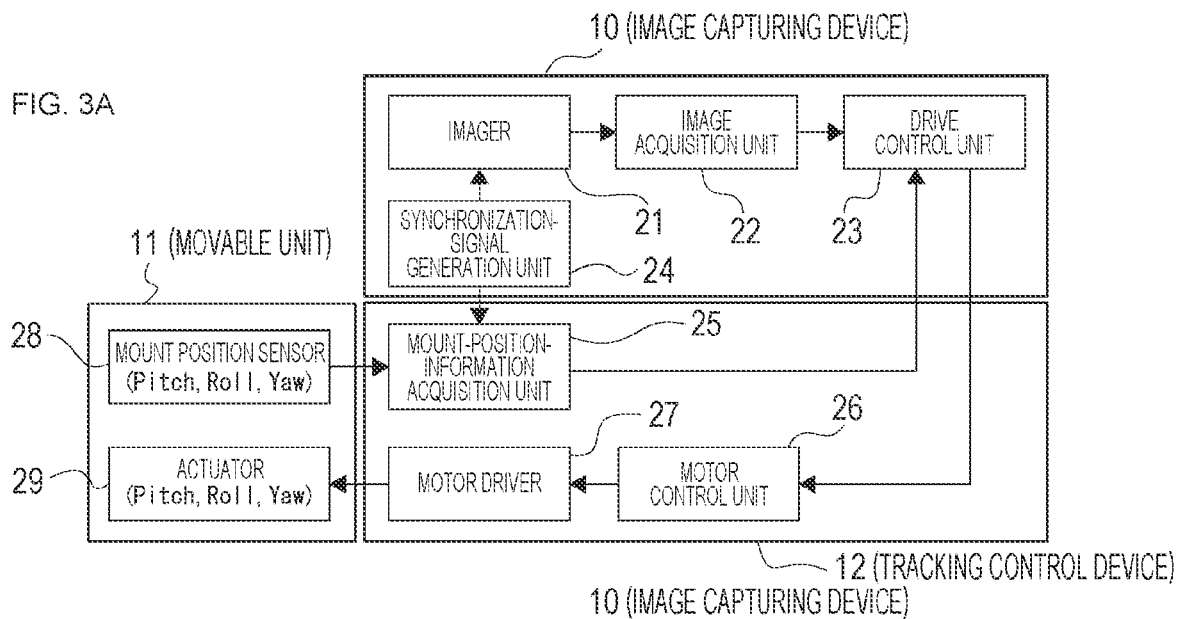
FIGS. 3A, 3B, and 3C are explanatory diagrams of a layout example of the main part of the embodiment.
Figure 3B:
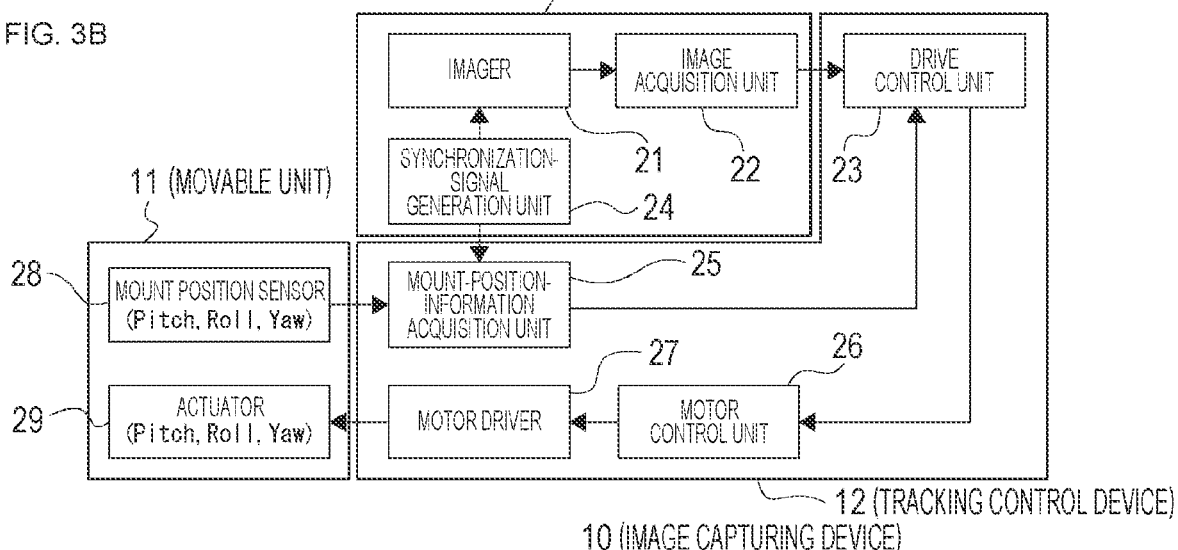
Figure 3C:
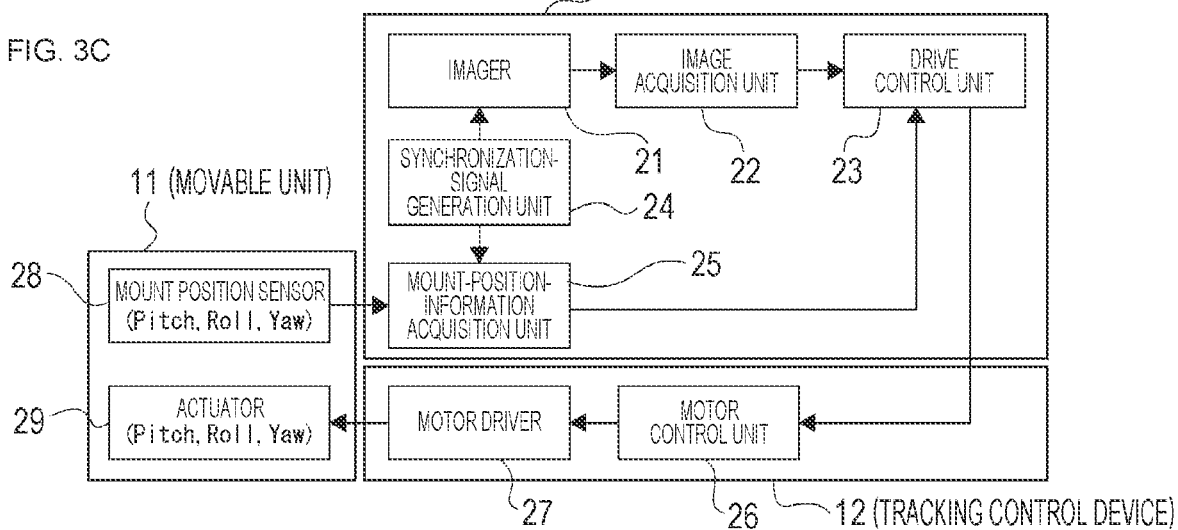

FIGS. 3A, 3B, and 3C show other examples.

FIG. 3A shows an example in which the imager 21, the image acquisition unit 22, the drive control unit 23, and the synchronization-signal generation unit 24 are provided in the image capturing device 10, and the mount-position-information acquisition unit 25, the motor control unit 26, and the motor driver 27 are provided in the tracking control device 12.

This is an example in which the drive control unit 23 is realized by an information processing device such as a central processing unit (CPU), DSP, or the like in the image capturing device 10.

Also, this is an example in which the horizontal synchronization signals and the vertical synchronization signals from the synchronization-signal generation unit 24 in the image capturing device 10 are transmitted to a tracking-control-device-12 side.

FIG. 3B shows an example in which the imager 21, the image acquisition unit 22, and the synchronization-signal generation unit 24 are provided in the image capturing device 10, and the drive control unit 23, the mount-position-information acquisition unit 25, the motor control unit 26, and the motor driver 27 are provided in the tracking control device 12.

This is an example in which, in the tracking-control-device-12 side, the image signal is input for automatic tracking to carry out image analysis by the drive control unit 23, and the horizontal synchronization signals and the vertical synchronization signals from the image capturing device 10 are received to acquire the mount angular position.

FIG. 3C shows an example in which the imager 21, the image acquisition unit 22, the drive control unit 23, the synchronization-signal generation unit 24, and the mount-position-information acquisition unit 25 are provided in the image capturing device 10, and the motor control unit 26 and the motor driver 27 are provided in the tracking control device 12.

This is an example in which the tracking control device 12 is a drive device merely for turning, and processing for automatic tracking is configured to be carried out in an image-capturing-device-10 side.

Moreover, in the above cases of FIGS. 3A, 3B, and 3C, the tracking control device 12 is expected to be provided in the mount 1.

If the tracking control device 12 is provided in the mount 1, in the case of a configuration of FIG. 3A or FIG. 3C, the image capturing device 10 in which the drive control unit 23 is built serves as the drive control device of the present embodiment. Also, in the case of a configuration of FIG. 2 or FIG. 3B, the mount 1 in which the drive control unit 23 is built serves as the drive control device of the present embodiment.

If the tracking control device 12 is provided in the image capturing device 10, the image capturing device 10 serves as the drive control device of the present embodiment in all the cases of the configurations of FIGS. 2, 3A, 3B, and 3C.

Also, if the tracking control device 12 is separated from the image capturing device 10 or the mount 1, the tracking control device 12 serves as the drive control device of the present embodiment in the case of the configuration of FIG. 2 or FIG. 3B.

Figure 4:
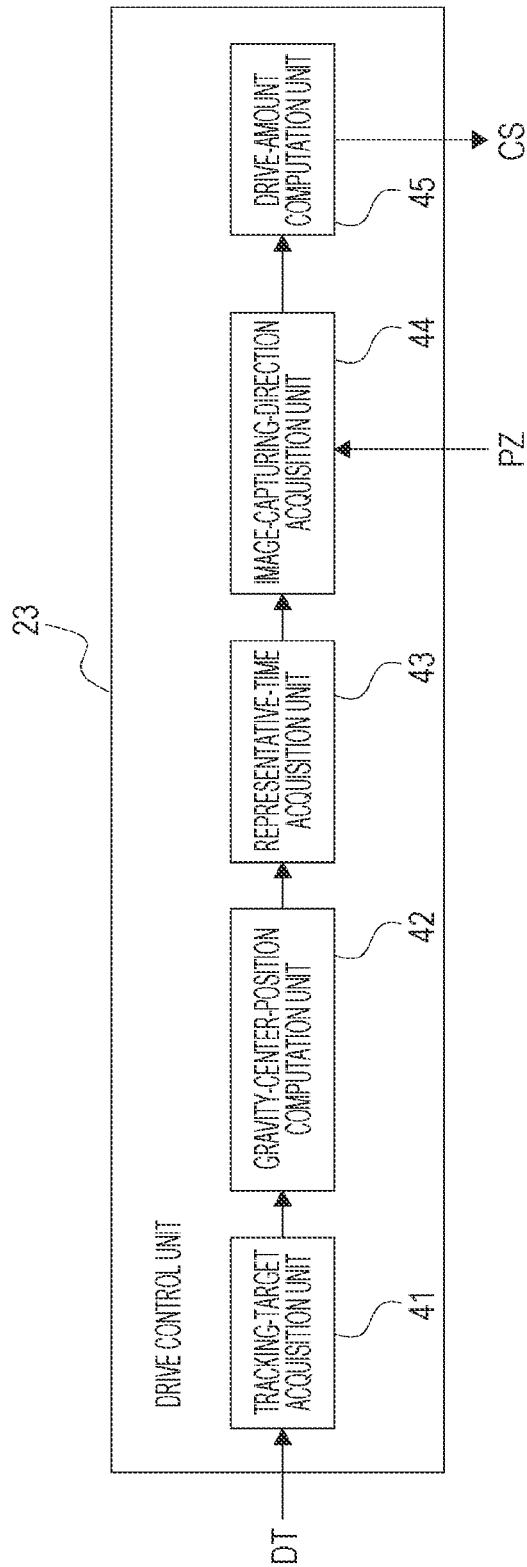
FIG. 4 is a block diagram of functions of a drive control unit of the embodiment.

In the image capturing system of each of the examples above, for example as shown in FIG. 4, the drive control unit 23 is provided with functional configurations as a tracking-target acquisition unit 41, a gravity-center-position computation unit 42, a representative-time acquisition unit 43, an image-capturing-direction acquisition unit 44, and a drive-amount computation unit 45.

These units are functions realized by software in the drive control unit 23 configured by the information processing device such as the CPU or DSP. However, these may be also configured by hardware.

The tracking-target acquisition unit 41 carries out processing of analyzing the image signal DT, which has captured an image with the imager 21 and been supplied from the image acquisition unit 22, and extracting the tracking-target object.

Various processing methods are conceivable. However, detailed description will be omitted since publicly known technologies can be used for the extraction per se of the tracking target object.

For example, there is a processing method in which an image is binarized according to color information to extract an object, which is a tracking target.

Also, a method in which an object position according to a convolutional neural network (CNN) is extracted by frame or segment separation and binarized to extract a tracking target object may also be used.

The gravity-center-position computation unit 42 carries out processing of carrying out a gravity center calculation, for example, based on the position and shape of the binarized and separated tracking target by the tracking-target acquisition unit 41 and determining a position of a particular line of the tracking-target object from among lines of a frame of the image signal.

The representative-time acquisition unit 43 carries out processing of acquiring time at which the particular line is subjected to exposure based on the particular line and determining representative time.

The image-capturing-direction acquisition unit 44 carries out processing of acquiring the image-capturing-direction information PZ (mount angular position) of the required point of time. For example, the information of the mount angular position of representative time is acquired from the mount-position-information acquisition unit 25.

The drive-amount computation unit 45 obtains the drive amount in the image capturing direction for tracking the tracking-target object by using the image-capturing-direction information of the representative time and a gravity center position of the tracking-target object. The drive control signal CS including this obtained drive amount is supplied to the motor control unit 26.

2. Action Outline

An outline of processing actions for automatic tracking executed by the drive control unit 23 having the functional configurations like FIG. 4 will be described.

Figure 5:
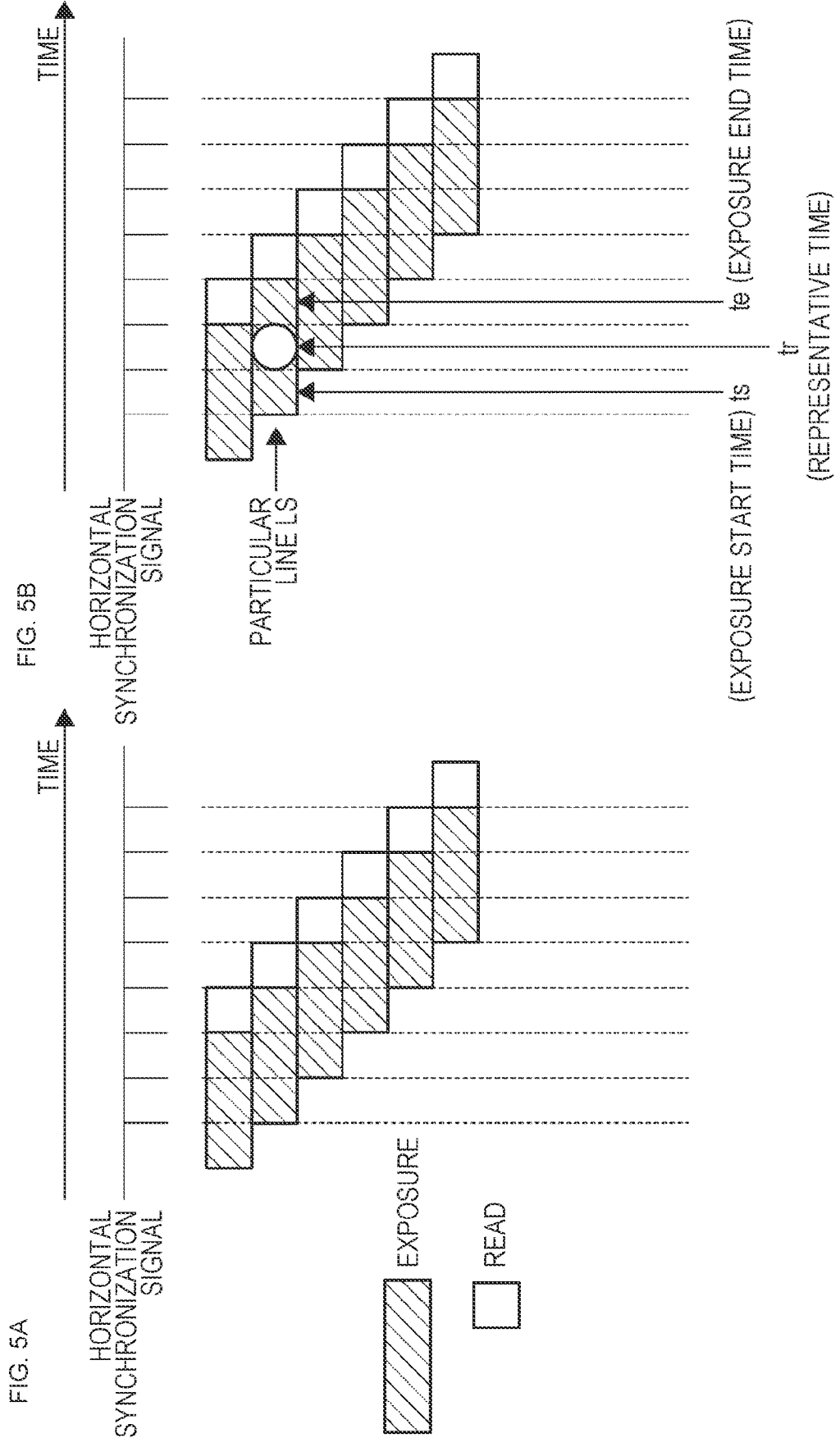
FIGS. 5A and 5B are explanatory diagrams of exposure timing and representative time of the embodiment.

In a case where exposure and reading of the rolling shutter style is carried out by the imager 21, exposure start and reading start are shifted at every line in a horizontal synchronization signal unit as shown in FIG. 5A. In the drawing, hatched parts represent exposure periods, and periods subsequent thereto are periods in which charges are read. FIG. 5A shows a case where exposure of a period length of three horizontal synchronization periods is carried out. Note that this exposure period is a period set as a shutter speed.

While the image capturing device 10 is being turned by the mount 1, the angle of the image which can be acquired is different depending on a vertical position of the image because of the rolling shutter style. In other words, a relation between the position in the image of the tracking target object and the image capturing direction is different in every line. Therefore, particularly when the mount 1 is rotating at a high speed or when the tracking-target object is at a high speed, computation accuracy of tracking is affected.

Therefore, in the present embodiment, a gravity center position serving as a representative as an in-image position of the tracking-target object is obtained, and the line including the gravity center position is specified. Furthermore, the representative time of exposure time of the particular line is obtained at accuracy (time resolution) determined by a frequency of the horizontal synchronization signal.

Also, as described above, the mount-position-information acquisition unit 25 has acquired the mount angular position in accordance with the horizontal synchronization signal.

As a result, the image-capturing-direction information PZ (mount angular position) of the representative time can be acquired.

In other words, the mount angular position at time when the representative position (gravity center position) in the image of the tracking-target object is exposed can be acquired, and a difference of the gravity center position from an image center corresponds to a drive amount by which the mount 1 is to be turned for tracking.

Such processing is executed by the functions of FIG. 4.

The tracking-target acquisition unit 41 of FIG. 4 first extracts the tracking-target object as a pixel range in which the tracking target object is captured in the image, and the gravity-center-position computation unit 42 obtains the gravity center position of the pixel range of the tracking-target object. This gravity center position can be conceived as a representative position of the tracking-target object in the image.

The representative-time acquisition unit 43 obtains the representative time of the image (frame) of a processing target based on the gravity center position. Specifically, to which line in the frame the obtained gravity center position corresponds to is specified. This corresponds to finding out at which line of the imager 21 using the CMOS sensor exposure has been carried out.

A particular line LS shown in FIG. 5B is assumed to be a line at which the gravity center position of the tracking-target object is present.

Representative time tr is determined in the exposure period of this particular line LS. In this case, an example in which intermediate timing between exposure start time ts and exposure end time te serves as the representative time tr is shown.

Specifically, the representative-time acquisition unit 43 acquires the exposure start time ts and the exposure end time te of the particular line LS as time in the horizontal synchronization signal unit. Then, time serving as an intermediate value is obtained based on the acquired time information, and the time is defined as the representative time tr.

Next, the image-capturing-direction acquisition unit 44 retrieves the mount angular position of the timing of the representative time tr from an information group of mount angular positions acquired and stored by the mount-position-information acquisition unit 25.

Figure 6:
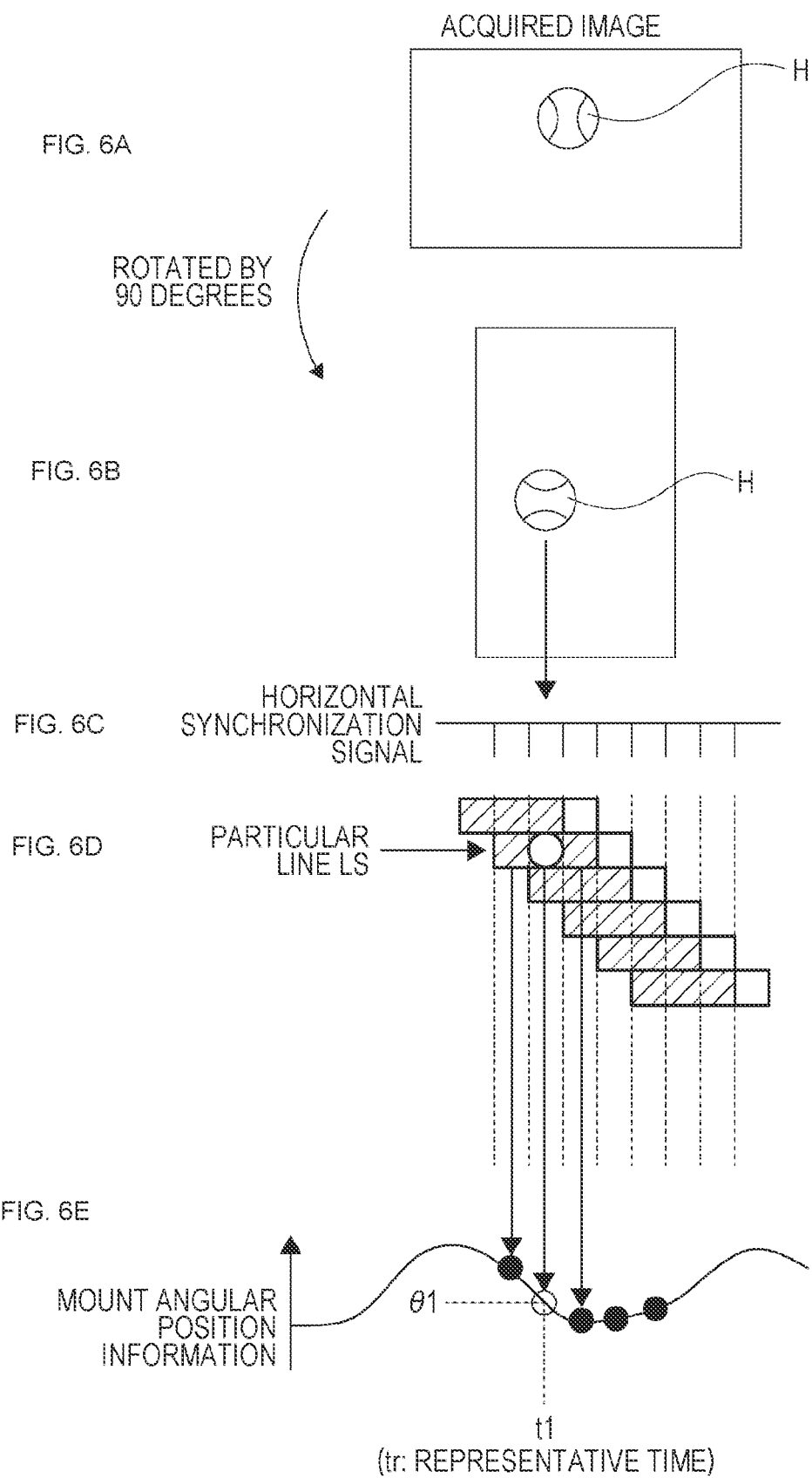
FIGS. 6A, 6B, 6C, 6D, and 6E are explanatory diagrams of a mount angular position of representative time of the embodiment.

FIGS. 6C and 6D show relations between the representative time and the mount angular positions.

An image of FIG. 6A is an acquired image of one certain frame. FIG. 6B shows this image rotated by 90°. FIG. 6B shows each line of the image in a manner corresponding to the horizontal synchronization signal of FIG. 6C.

In this case, the line in which the gravity center position of the in-image position of a tracking-target object H is present is the particular line LS of FIG. 6D, and time t1 is assumed to be the representative time tr obtained from the particular line LS.

A waveform of FIG. 6E shows changes in the angular position (mount angular position) caused by turning of the mount 1. For example, it is only required to be conceived as changes in the yaw direction (as a matter of course, it may be conceived as changes in the pitch direction)).

The mount angular position is acquired and stored by the mount-position-information acquisition unit 25 at every timing corresponding to the horizontal synchronization signal. For example, while the mount angular position is being varied like this FIG. 6D, the information of the mount angular positions at points of time represented by ● or ○ on a curved line is acquired and stored.

Therefore, if the representative time tr is determined, the information of the mount angular position corresponding to the representative time tr can be acquired from the mount-position-information acquisition unit 25 as shown by ○.

The drive-amount computation unit 45 can obtain the drive amount for tracking from the information of the mount angular position and the position of the tracking-target object H on the image.

For example, in a system which carries out control so that the tracking-target object H is placed at the center of the captured image, the drive amount to drive the mount 1 can be obtained from the mount angular position (image-capturing-direction information) of the point of time of the representative time tr and the position (for example, the gravity center position) of the tracking-target object H on the image.

The mount angular position (image-capturing-direction information) corresponds to an optical axis direction of the image-capturing optical system of the image capturing device 10 and, therefore, corresponds to a center position of the captured image. Then, the difference between the gravity center position of the tracking-target object H in the captured image and the mount angle information corresponds to the drive amount for causing the tracking-target object H to be positioned at the center in the image.

Particularly, in the case of the present embodiment, since the gravity center position and the mount angular position of the same time (the same time at the accuracy of the horizontal synchronization signal) are obtained, the difference thereof indicates a precise difference of the position of the mount 1 or the tracking-target object H at the representative time tr. This does not obtain the difference between the object position in an image of a certain point of time and the mount angular position of a different point of time. Regarding this point, the precise difference of the same point of time can be obtained, and highly accurate tracking can be carried out.

A specific processing example will be described as a first embodiment.

Note that the drive control unit 23 provided with above functions may be configured to determine an objective position of the mount in consideration of the mount position information of actual control timing. This will be described as a second embodiment.

Also, a behavior tendency in an absolute direction of the tracking-target object H can be obtained by retaining sets of mount angular positions and position information of the tracking-target object H by an amount corresponding to several past images. Therefore, the drive control unit 23 can also predict the absolute direction of the tracking-target object H of a certain future point of time based on the information and determine an objective position of the mount 1. This will be described as third and fourth embodiments.

3. First Embodiment

Processing of the first embodiment will be described with FIGS. 7 and 8A. The processing shown in FIG. 7 is executed by the drive control unit 23 provided with the functions of FIG. 4.

Figure 7:
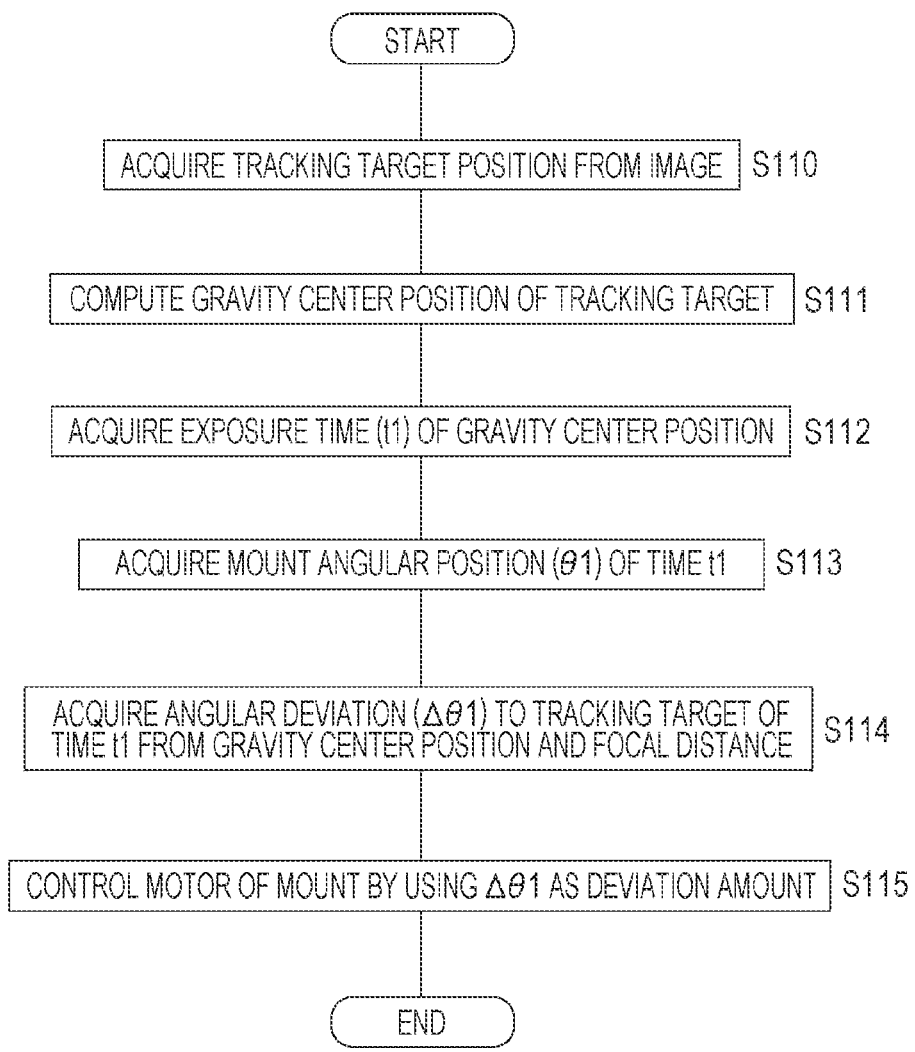
FIG. 7 is a flow chart of tracking control of a first embodiment.

At least in a period in which image capturing (action of the imager 21) is carried out by the image capturing device 10 and automatic tracking is carried out by the action of the mount 1, the drive control unit 23 carries out the processing of FIG. 7 every time the image signal DT of one frame is supplied. For example, the processing of FIG. 7 is carried out by the drive control unit 23 for every single frame by supplying the image signal DT of every frame from the image acquisition unit 22 to the drive control unit 23. Note that this point is similar also in later-described FIG. 9, FIG. 11, and FIG. 14.

In step S110 of FIG. 7, the drive control unit 23 acquires the position of the tracking-target object H in the image from the supplied image signal DT. This is processing of extracting the pixel range of the tracking-target object H by the above described function of the tracking-target acquisition unit 41.

In step S111, the drive control unit 23 obtains the gravity center position of the tracking-target object H as the processing of the function of the gravity-center-position computation unit 42.

In step S112, the drive control unit 23 acquires the exposure time t1 of the gravity center position as the representative time tr by the function of the representative-time acquisition unit 43.

In step S113, the drive control unit 23 acquires the information of a mount angular position $\theta 1$ of the time t1 by the function of the image-capturing-direction acquisition unit 44.

Figure 8A:
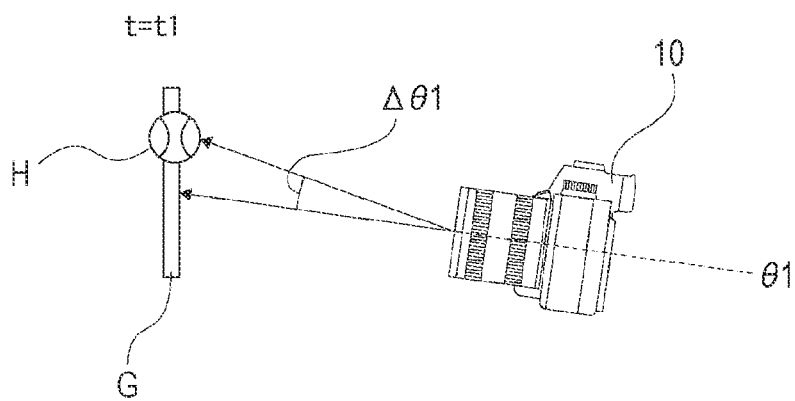
FIGS. 8A and 8B are explanatory diagrams of tracking control of the first and second embodiments.

FIG. 8A shows the mount angular position $\theta 1$ of the time t=t1 as an example of a case of turning in the pitch direction. In this case, the actual position of the tracking-target object H is shown, but the direction of the mount angular position $\theta 1$ is the center of the captured image as the position in the image. In the drawing, an image G is shown in a simulated manner in order to show that the tracking-target object H is shifted from the image center.

In step S114, the drive control unit 23 acquires an angular deviation $\Delta \theta 1$ to the tracking-target object H at the time t1 from the gravity center position in the image and a focal distance by the function of the drive-amount computation unit 45. Note that the focal distance is obtained from depth information accompanying each pixel of the image signal DT. By virtue of this, the focal distance at the gravity center position of the tracking-target object H can be determined, and the angular deviation $\Delta \theta 1$ shown in FIG. 8A can be calculated.

The angular deviation $\Delta \theta 1$ is a difference between the mount angular position $\theta 1$ and the position of the tracking-target object H at the time t1. Therefore, the mount 1 is only required to be controlled so as to cause this difference to be zero.

Therefore, in step S115, the drive control unit 23 transmits the drive control signal CS, which includes the drive amount for eliminating the angular deviation $\Delta \theta 1$, to the motor control unit 26 to drive the actuator 29 of the mount 1.

Therefore, the mount 1 is driven so as to eliminate the deviation at the time t1. Thus, by carrying out this control for each frame, automatic tracking is carried out so that the tracking-target object H is positioned at the center of the captured image.

4. Second Embodiment

Processing of the drive control unit 23 as the second embodiment will be described by using FIGS. 8A, 8B, 9, 10A, 10B, 10C, 10D, and 10E. This second embodiment is an example in which the drive control unit 23 is configured to obtain the drive amount in consideration of the mount angular position of the control timing at which drive control is carried out in addition to the first embodiment, and, for example, processing of FIG. 9 is carried out.

Figure 9:
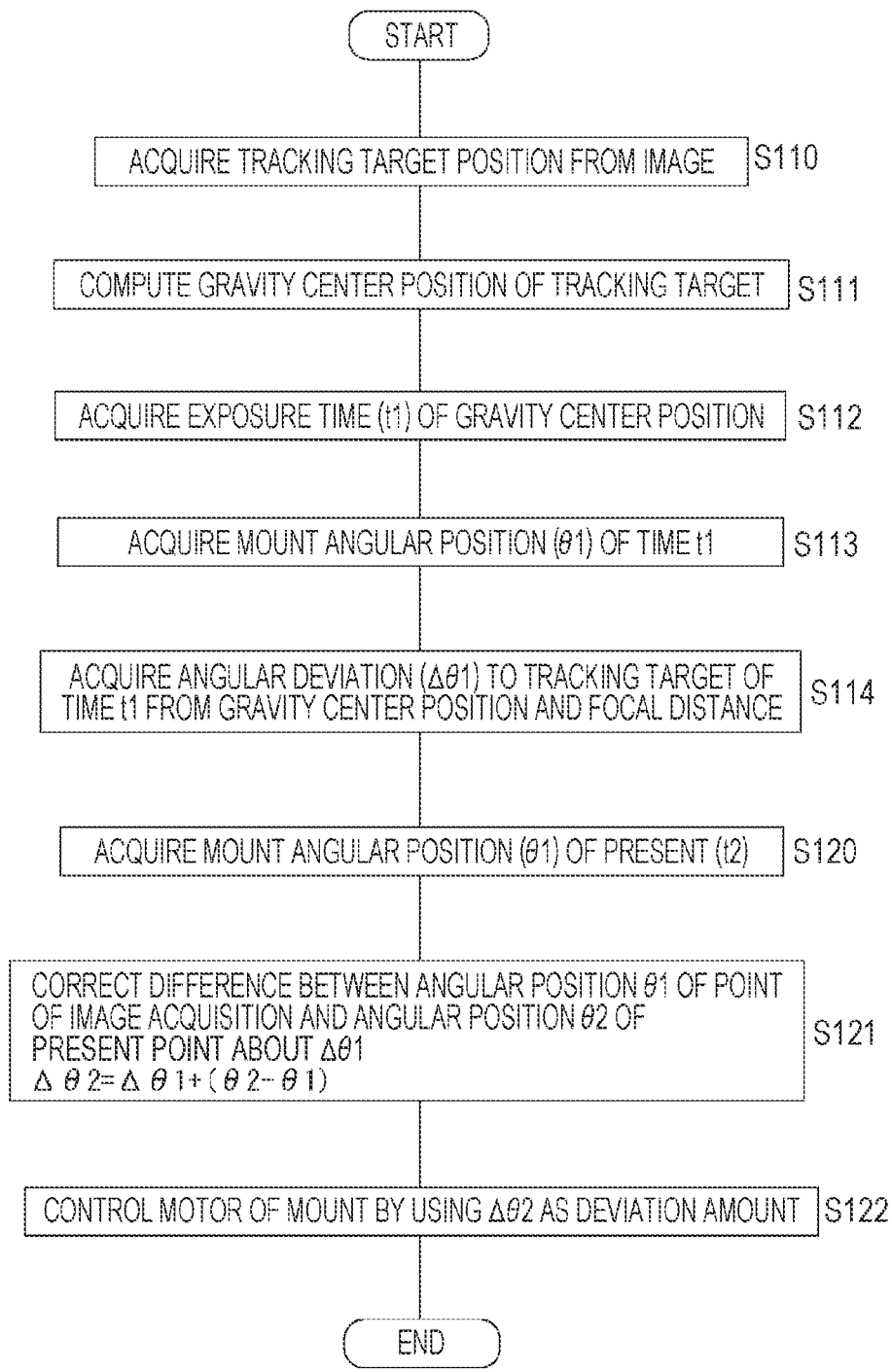
FIG. 9 is a flow chart of the tracking control of the second embodiment.

Steps S110 to S114 of FIG. 9 are similar to those of FIG. 7. More specifically, in processing of steps S110 to S114, the drive control unit 23 calculates the angular deviation $\Delta\theta1$, which is shown in FIG. 8A, by using the mount angular position $\theta1$ and the gravity center position of the tracking-target object H of the representative time tr=t1.

In step S120, the drive control unit 23 acquires a mount angular position $\theta2$ of present time t2. The present (time t2) is the point of time of processing of step S120 of this FIG. 9, in other words, execution timing of drive control of the mount 1. Therefore, the drive control unit 23 acquires latest information of the mount angular position detected by the mount position sensor 28 at the present point of time from the mount-position-information acquisition unit 25.

Figure 8B:
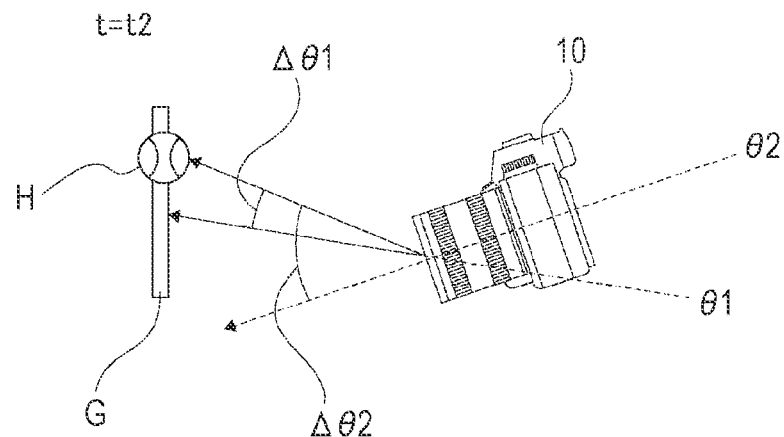

FIG. 8B shows an example of the mount angular position $\theta2$ of the time t2. This is caused by displacement in the rotation angular position caused by turning of the mount 1 from the representative time t1 (the representative time tr at which the tracking-target object H is exposed) to the present time t2 shown in FIG. 8A.

In step S121, the drive control unit 23 corrects the angular deviation $\Delta\theta1$. More specifically, a difference $\Delta\theta2$ between the angular position $\theta1$ of the time t1, which is the point of time of image acquisition (representative time tr), and the angular position $\theta2$ of the present time t2 with the angular deviation $\Delta\theta1$ is obtained.

More specifically, the difference $\Delta\theta2$=(angular deviation $\Delta\theta1$)+(angular position $\theta2-\theta1$) is obtained.

This reflects the turning amount of the mount 1 up to the present to the angular deviation $\Delta\theta1$ of the point of time of image acquisition. The difference $\Delta\theta2$ is shown in FIG. 8B.

Then, in step S122, for a deviation amount to eliminate $\Delta\theta2$, the drive control unit 23 carries out, for example, proportional-integral-differential (PID) control to carry out motor control of the mount 1 with a required drive amount. More specifically, the drive control unit 23 transmits the drive control signal CS, which uses the difference $\theta2$ which has reflected the angular deviation $\Delta\theta1$ to the present rotation angular position for correction as the drive amount, to the motor control unit 26 to drive the actuator 29 of the mount 1.

FIGS. 10A, 10B, 10C, 10D, and 10E schematically show states of above actions.

Figure 10A:
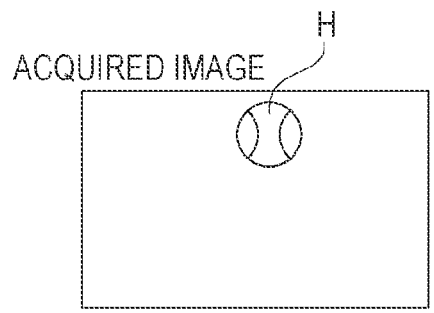
FIGS. 10A, 10B, 10C, 10D, and 10E are explanatory diagrams of the tracking control of the second embodiment.
Figure 10B:
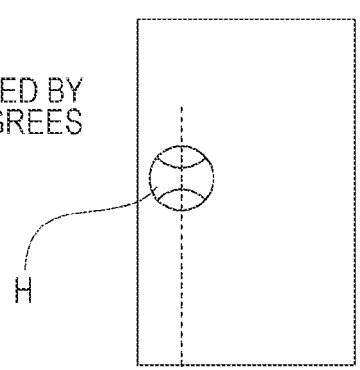
Figure 10C:

FIG. 10A is an image of one acquired frame, and FIG. 10B shows FIG. 10A rotated by 90 degrees so that lines of the one frame correspond to horizontal synchronization signals of FIG. 10C.

Figure 10D:
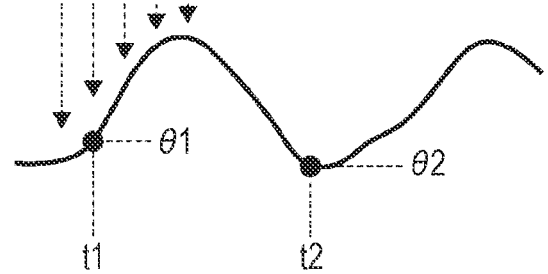

FIG. 10D shows changes in the mount angular position acquired by the mount-position-information acquisition unit 25. Each of the mount angular positions is acquired at every timing corresponding to the horizontal synchronization signal, and time-series changes in the mount angular positions are shown by a curved line as an example.

Also, the mount angular position $\theta1$ is obtained at the point of time of the representative time tr=t1 on the line including the gravity center position of the tracking-target object H.

Figure 10E:
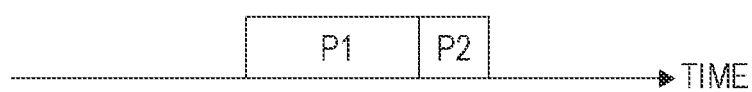

FIG. 10E schematically shows processing contents of the second embodiment.

More specifically, as processing P1, processing of obtaining the position of the tracking-target object H in the image and obtaining the mount angular position $\theta1$ of the representative time tr (time t1) is shown.

Also, processing P2 shows processing of obtaining the mount angular position $\theta2$ of the time t2, which is control timing, and obtaining the drive amount by reflecting the difference $\Delta\theta2$ of the mount angular positions $\theta1$ and $\theta2$.

More specifically, the processing P2 compensates for occurrence of the change in the mount angular position caused by the temporal difference between the representative time tr (time t1) and the present time t2.

According to the second embodiment like this, drive control that takes the movement of the mount 1 from the time t1 to the time t2 into consideration can be executed while eliminating the deviation at the time t1. Therefore, by carrying out this control for each frame, automatic tracking can be carried out at higher accuracy so that the tracking-target object H is positioned at the center of the captured image.

5. Third Embodiment

The third embodiment will be described by using FIGS. 11, 12A, 12B 12C, 13A, 13B, and 13C. This third embodiment is an example in which an objective position of the mount 1 is controlled by predicting movement of the tracking-target object H by using a group of pairs of information of the gravity center positions of past multiple tracking-target objects H and the mount angular positions of the mount 1 and using the mount angular position of the mount 1 of the control timing.

Figure 11:
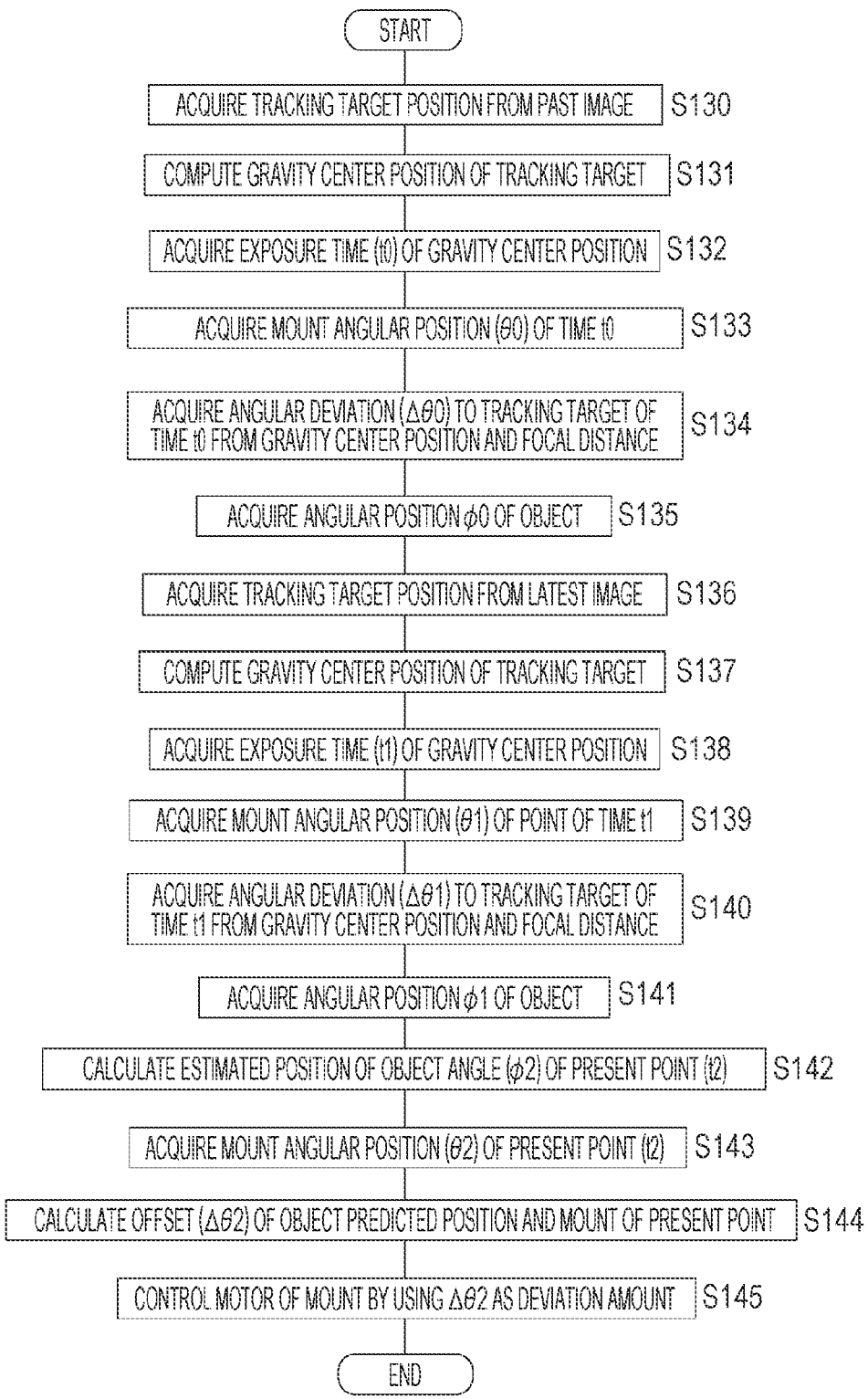
FIG. 11 is a flow chart of tracking control of a third embodiment.

The drive control unit 23 carries out processing of FIG. 11, for example, every time the image signal DT of one frame is input.

As steps S130 to S135, the drive control unit 23 uses past images as processing targets.

First, in step S130, the drive control unit 23 acquires, from the past image, the position of the tracking-target object H in the image.

The past image is, for example, the image signal DT of a frame which is before a frame serving as the input latest image signal DT by a predetermined frame(s). For example, this is the past image signal DT which is, for example, one frame earlier or two frames earlier.

Since the past images are used as processing targets in this manner, for example, the drive control unit 23 is only required to be provided with a frame memory, which temporarily stores the image signals DT only for a predetermined frame period.

In step S131, the drive control unit 23 obtains the gravity center position of the tracking-target object H in the past image.

In step S132, the drive control unit 23 acquires exposure time t0 of the gravity center position. This is the time which serves as representative time tr of the past image.

In step S133, the drive control unit 23 acquires information of a mount angular position $\theta0$ of a point of the time t0.

As an example of a case of turning in the pitch direction, FIG. 12A shows the mount angular position $\theta0$ of the time t=t0, which is the exposure time of the tracking-target object H in the past image. An origin $\theta=0$ indicates an absolute direction. In other words, this is a position serving as a reference which is not changed depending on the mount angular position or the object.

Note that, similarly to FIG. 12A, FIG. 13A shows the mount angular position $\theta0$ about turning in the yaw direction.

FIGS. 12A and 13A show actual positions of the tracking-target object H with the origin θ=0 serving as the reference. Note that, regarding the position in the image, the direction of the mount angular position θ0 is the center of the captured image.

In step S134, the drive control unit 23 acquires an angular deviation Δθ0 to the tracking-target object H at the time t0 from the gravity center position in the image and a focal distance.

The angular deviation Δθ0 is a difference between the mount angular position θ0 and the position of the tracking-target object H at the time t0.

In step S135, the drive control unit 23 acquires an angular position φ0 of the tracking-target object H.

Since the mount angular position θ0 is the angular position using the origin θ=0 as the reference, the angular position φ0 of the tracking-target object H can be obtained as φ0=θ0+Δθ0 (see FIG. 12A, FIG. 13A).

Subsequently, the drive control unit 23 uses the latest image as a processing target in steps S136 to S141.

First, in step S136, the drive control unit 23 acquires the position of the tracking-target object H in the image from the latest image.

The latest image is one frame serving as the latest image signal DT which has been input at this point of time.

In step S137, the drive control unit 23 obtains the gravity center position of the tracking-target object H in the latest image.

In step S138, the drive control unit 23 acquires the exposure time t1 of the gravity center position. This is the time which serves as representative time tr of the latest image.

In step S139, the drive control unit 23 acquires information of a mount angular position θ1 of a point of the time t1.

FIGS. 12B and 13B show the mount angular position θ1 of the time t=t1, which is the exposure time of the tracking-target object H in the latest image by using the origin θ=0 as a reference.

In step S140, the drive control unit 23 acquires an angular deviation Δθ1 to the tracking-target object H at the time t1 from the gravity center position in the image and a focal distance.

The angular deviation Δθ1 is a difference between the mount angular position θ1 and the position of the tracking-target object H at the time t1.

In step S141, the drive control unit 23 acquires an angular position φ1 of the tracking-target object H.

Since the mount angular position θ1 is the angular position using the origin θ=0 as the reference, the angular position φ1 of the tracking-target object H can be obtained as φ1=θ1+Δθ1 (see FIG. 12B, FIG. 13B).

Subsequently, in step S142, the drive control unit 23 calculates an estimated angular position φ2 of the tracking-target object H at present time t2.

This is calculated by using the angular positions φ0 and φ1 of the time t0 and t1. For example, $$\varphi 2=(\varphi 1-\varphi 0)/(t1-t0)\times t2+\varphi 0$$

is used. More specifically, the predicted position of the absolute position of the object H in the present is obtained by linear computation from the angular positions φ0 and φ1, which are the absolute positions of the tracking-target object H at two past points of time.

Note that it goes without saying that this calculation example is an example. In any case, it is only required to obtain the present predicted position of the tracking-target object H from the past information.

In step S143, the drive control unit 23 acquires a mount angular position θ2 of the present time t2 (execution timing of the drive control) from the mount-position-information acquisition unit 25.

FIGS. 12C and 13C show the estimated angular position φ2 of the tracking-target object H and the mount angular position θ2.

In step S144, the drive control unit 23 obtains an angular deviation Δθ2 of the present point of time.

More specifically, the angular deviation Δθ2 is obtained as an offset of the estimated angular position φ2 of the tracking-target object H of the time t2 and the mount angular position θ2 (see FIG. 12C, FIG. 13C).

Then, in step S145, the drive control unit 23 carries out motor control of the mount 1 by using the angular deviation Δθ2 as a deviation amount to be eliminated. More specifically, the drive control unit 23 transmits the drive control signal CS, which uses PID control, to the motor control unit 26 so as to eliminate the angular deviation Δθ2 to drive the actuator 29 of the mount 1.

According to the third embodiment like this, control is carried out so as to eliminate the offset of the mount angular position θ2 of the present point of time while prediction of the position of the tracking-target object H of the present point of time is carried out. Then, the past angular positions φ0 and φ1 of the object used in the computation of the predicted position do not have errors in terms of a temporal axis since the positions are obtained respectively by pairs which do not have shifts in timing, and each of the pairs includes the gravity center position of the object in the image and the mount angular position of the point of time of exposure. Therefore, the estimated angular position φ2 also has good accuracy. Therefore, by carrying out this control for each frame, automatic tracking can be carried out at higher accuracy so that the tracking-target object H is positioned at the center of the captured image.

6. Fourth Embodiment

The fourth embodiment makes the processing of the third embodiment more efficient.

In FIG. 11 of the above described third embodiment, the drive control unit 23 obtains the mount angular position θ0 and the angular position φ0 of the tracking-target object H about the past image in steps S130 to S135. However, these are the same as the processing of obtaining the mount angular position θ1 and the angular position φ1 of the tracking-target object H about the latest image in steps S136 to S314. For example, if the past image is an image which is one frame before, the mount angular position θ1 and the angular position φ1 about the latest image obtained in steps S136 to S314 become the mount angular position θ0 and the angular position φ0 about the past image in the next frame.

Figure 14:
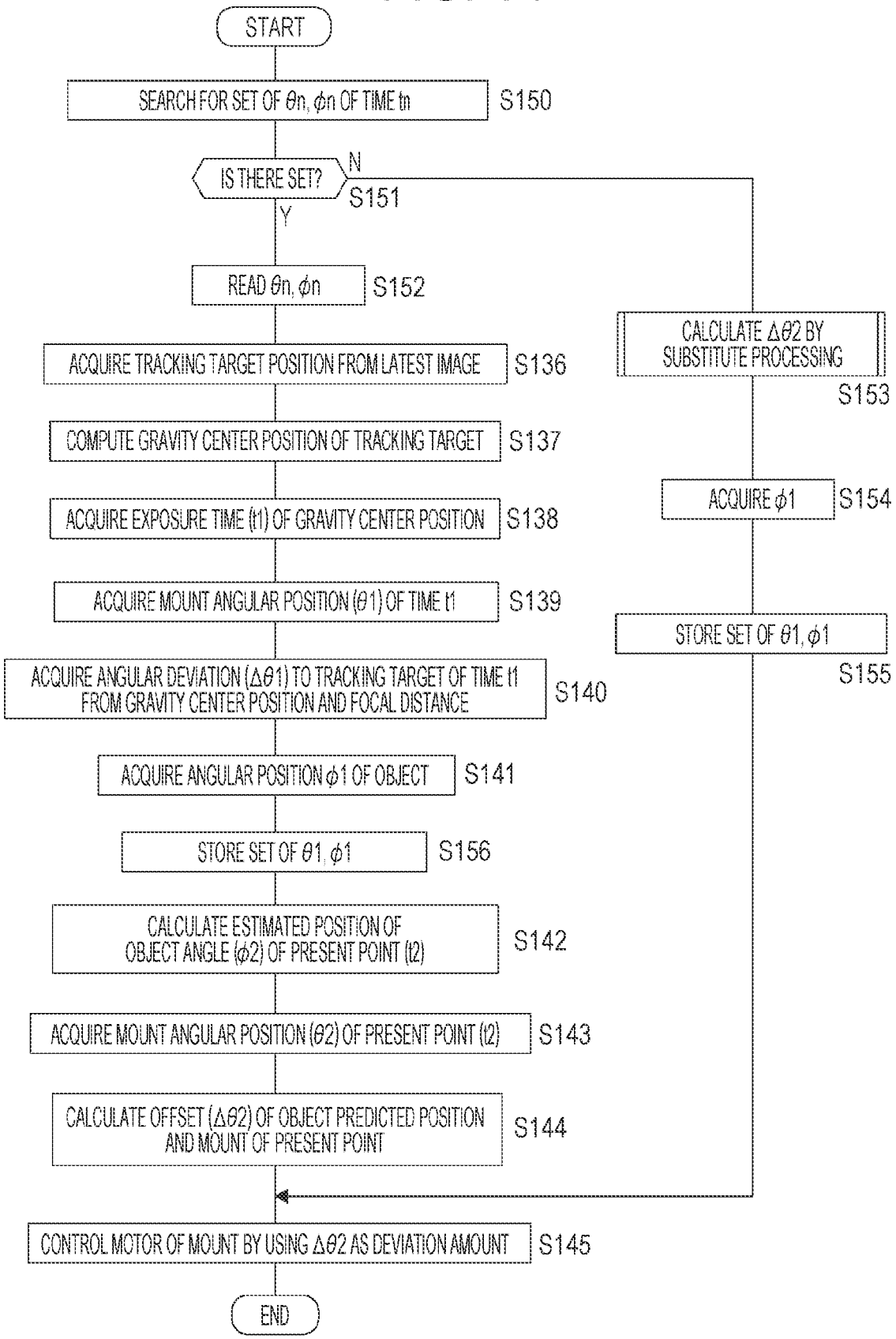
FIG. 14 is a flow chart of tracking control of a fourth embodiment.

Therefore, a set of the mount angular position θ1 and the angular position φ1 about the latest image is stored so that these can be used later. Such processing is shown in FIG. 14.

In step S150, the drive control unit 23 carries out a search whether or not a set of a mount angular position θn (for example, θ0) and an angular position φn (for example, φ0) of time tn (for example, time t0 if n=0) belonging to a past image is stored. For example, whether or not these are stored in an internal memory of the drive control unit 23 is checked.

Then, if the set thereof is stored, the drive control unit 23 proceeds from step S151 to S152 and reads the mount angular position θn (=θ0) and the angular position φn (=φ0) stored therein. The mount angular position θ0 and the angular position φ0 acquired in this manner are the same as the mount angular position θ0 and the angular position φ0 acquired in steps S130 to S135 of FIG. 11.

Subsequently, similarly to FIG. 11, in steps S136 to S141, the drive control unit 23 obtains the mount angular position θ1 and the angular position φ1 of the tracking-target object H about a latest image.

At this point in step S156, the drive control unit 23 stores, for example in the internal memory, the angular position θ1 and the angular position φ1 obtained so that they can be used as the mount angular position θ0 and the angular position φ0 of the past image at a later point of time (for example, next frame).

Processing of steps S142 to S145 is similar to that of FIG. 11. More specifically, the angular deviation Δθ2 is obtained as the deviation amount to be eliminated in the end, and motor control of the mount 1 is carried out on the basis of this.

In this manner, regarding the mount angular position θ0 and the angular position φ0 about the past image, processing can be made more efficient and computation load can be reduced by storing the values obtained for the latest image.

Note that if it is determined in steps S150 and S151 that the mount angular position θ0 and the angular position φ0 about the past image are not stored, the drive control unit 23 obtains the angular deviation Δθ2 by substitute processing in step S153. For example, it is conceivable to obtain the angular deviation Δθ2 by the processing of steps S110 to S121 of FIG. 9.

In this process, the drive control unit 23 calculates the angular position φ0 in step S154 and stores, for example in the internal memory, the mount angular position θ0 and the angular position φ0 in step S155 so that they can be used as the mount angular position θ0 and the angular position φ0 of the past image at a later point of time.

Then, the process proceeds to step S145, and motor control of the mount 1 is carried out so as to eliminate the angular deviation Δθ2 obtained by the substitute processing.

Therefore, even in a case where the mount angular position θ0 and the angular position φ0 about the past image are not stored, processing omitting the calculations thereof can be carried out, for example, from a point of time of a next frame.

7. Fifth Embodiment

Meanwhile, although it has been assumed in above embodiments that the image capturing device 10 obtains the image signal DT for processing for tracking, there is also a case where the image capturing device (image capturing device for recorded images) 10 for capturing recorded images and a tracking image-capturing device 10A, which acquires images for tracking processing, are separated from each other.

Figure 15:
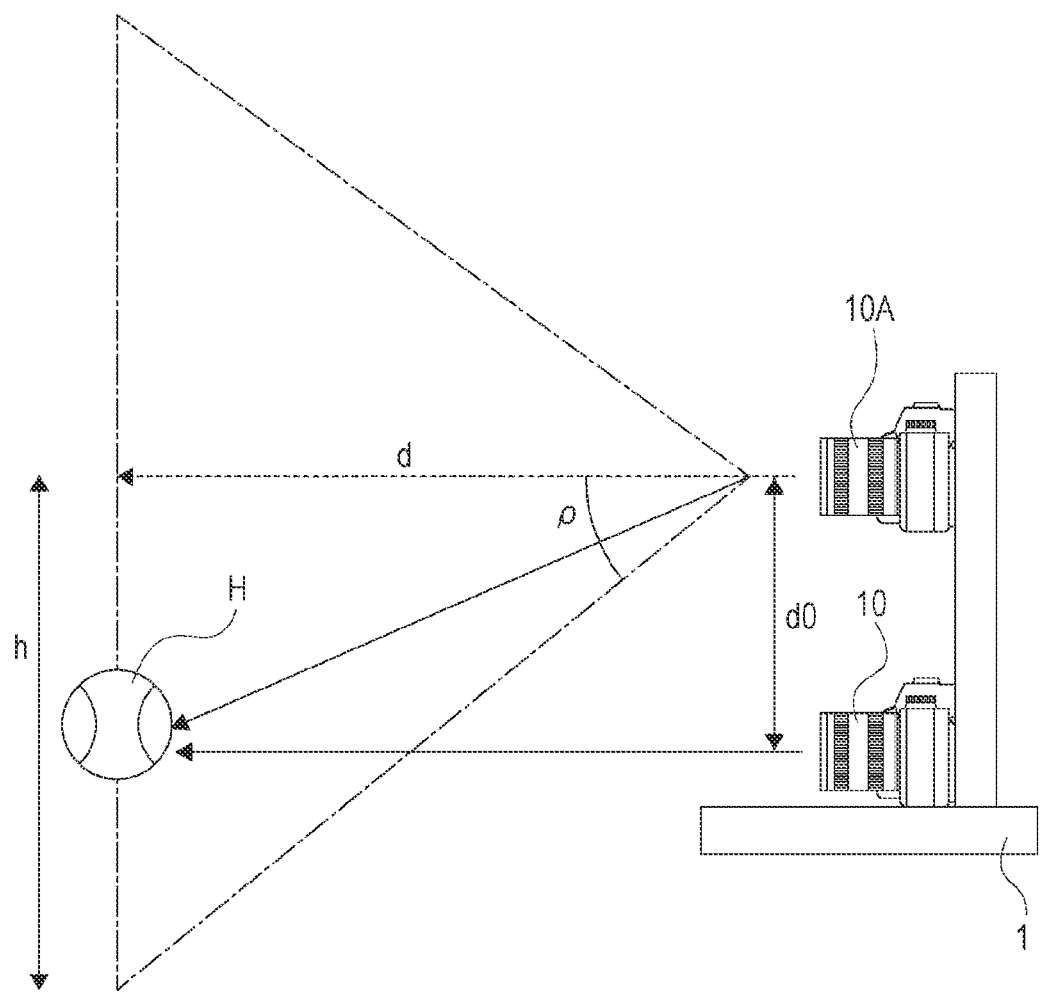
FIG. 15 is an explanatory diagram of parallax of a fifth embodiment.

FIG. 15 shows an example in which the image capturing device 10 and the tracking image-capturing device 10A are mounted on the mount 1. The image capturing device 10 and the tracking image-capturing device 10A are mounted on the mount 1 so that the same image capturing directions are always obtained by turning of the mount 1.

In a fifth embodiment, such a system is expected, and tracking which takes parallax of the two image capturing devices 10 and 10A into consideration is configured to be carried out so that the position of a tracking-target object in an image recorded in an image-capturing-device-10 side is always at a desired position (for example, screen center).

In a case where the image capturing device 10 and the tracking image-capturing device 10A are separated from each other, the parallax between these image capturing devices sometimes has influence. For example, in a case where a tracking target is desired to be tracked while the tracking target is always captured at an image center, if tracking is carried out so as to capture the tracking target at the image center based on the image of the tracking image-capturing device 10A, a shift corresponding to the parallax is generated in a recording image-capturing-device-10 side. This shift is significant in a case where a distance between the image capturing device 10 and the tracking-target object H is short.

Therefore, the drive control unit 23 carries out control so as to eliminate the shift corresponding to the parallax.

At this moment, it is assumed that a distance d0 of optical axes between the image capturing devices shown in FIG. 15 is already known in a type in which the tracking image-capturing device 10A, which acquires an image to be analyzed for tracking the tracking-target object H, and the image capturing device 10, which records an image, are separated from each other.

The tracking image-capturing device 10A analyzes the position of the tracking-target object H in the image and, in addition to that, also measures a distance d to the tracking target.

There is a following example as a method of measuring the distance d.

In a case where it is possible to keep focusing on the tracking-target object H while carrying out an automatic focusing action, the distance d can be estimated from the position of a focus lens.

Furthermore, in a case where the tracking image-capturing device 10A includes a plurality of devices, the distance d at the tracking-target object H can be estimated by stereo matching using two images.

Alternatively, if a size of the tracking-target object H is already known, it is also possible to estimate the distance d from the size of the tracking-target object H in the image.

If the tracking target object is desired to be captured at the center of the image by the image capturing device 10 for recording, after the distance d to the object is estimated by using the above described distance measuring method, a distance h corresponding to a half of a tracking camera image frame can be calculated by $h = d \cdot \tan \rho$ according to the already known distance d0 and a half value ρ (already known value) of a view angle of the tracking image-capturing device 10A.

The tracking image-capturing device 10A tracks the tracking-target object H with an offset of $d0/h \cdot 100[\%]$ of an image height, and, as a result, the tracking-target object H is positioned at the center of an image which is the image of the image-capturing-device-10 side for recording.

In this manner, for example, in a system which controls the tracking image-capturing device 10A so that the tracking-target object H is positioned at the center of the image, the mount angular position θ1, the position of the tracking-target object H in the image, and an offset amount from the mount angular position of the present point of time are computed so as to determine an objective position of the mount.

More specifically, it is sufficient if processing of the above described first, second, third, and fourth embodiments is carried out by using the image captured by the tracking image-capturing device 10A, but, in that process, tracking control is configured to be carried out by using a position, which has an offset of $d0/h \cdot 100[\%]$ of the image height, as a reference (center).

As a result of this, the image capturing device 10 for recording can be set in a manner that matches an intention of a person who records the image, and the tracking image-capturing device 10A can be set so as to be specialized in tracking. For example, if the tracking image-capturing device 10A uses a frame rate higher than that of the image capturing device 10, high-speed tracking control becomes advantageous.

8. Digest and Modification Examples

According to the above embodiments, following effects can be obtained.

A drive control device of the embodiment has a drive control unit 23 configured to control a drive amount in an image capturing direction for tracking an object on the basis of object information acquired from a captured image and image-capturing-direction information corresponding to a horizontal synchronization signal used in an image capturing action. Specifically, the drive control unit 23 of the embodiment is configured to control the drive amount in the image capturing direction for tracking the tracking-target object H by using the information of the tracking-target object H and the mount angular position (image-capturing-direction information) acquired at the timing based on the horizontal synchronization signal used in the image capturing action.

In the case of the rolling shutter style, in consideration of facts that the exposure start time is shifted at every line in the image and that exposure is carried out only for a time length defined by the shutter speed, the image-capturing-direction information is acquired in coordination with the timing of the horizontal synchronization signal so that the image-capturing-direction information corresponding to the point of time of exposure of the tracking-target object H in the captured image is obtained.

By virtue of this, the image-capturing-direction information of required timing such as the exposure timing of the tracking-target object H can be acquired.

For example, as the information of the tracking-target object H, the exposure time of the line (particular line LS) of the representative position (for example, the image gravity center position) of the tracking-target object H is determined, and the image-capturing-direction information (for example, the mount angular position) of that point of time is configured to be obtained. As a result, the mount angular position corresponding to the exposure timing of the representative position of the tracking-target object H in the image can be precisely obtained.

This means that, the relation between the position of the tracking-target object H in the image and the image capturing direction of the same timing can be obtained at higher accuracy in a state in which one or both of the tracking-target object H and the image capturing direction is moving. Therefore, this contributes to improvement in tracking accuracy and tracking performance with respect to a high-speed object in automatic tracking control.

In the embodiment, the information (object information) of the tracking-target object H is assumed to include the position information of the tracking-target object H in the captured image.

More specifically, the position information of the tracking-target object H captured in the captured image is configured to be used in drive control.

By obtaining the position of the tracking-target object H in the captured image and the mount angular position $\theta 1$ of the point of time of exposure of the position, a relative position relation between the position of the tracking-target object H in the image and the mount angular position $\theta 1$ can be precisely perceived.

The embodiment includes an example in which the image-capturing-direction information is information of the image capturing direction based on time of exposure start and exposure end of a particular line corresponding to the position information of the tracking-target object H included in the object information among a line of an image signal of the captured image. More specifically, this is an example in which the mount angular position $\theta 1$ as the image-capturing-direction information is the information of the image capturing direction acquired based on the horizontal synchronization signal of the particular line LS in the captured image corresponding to the position information included in the information of the tracking-target object H.

By obtaining the mount angular position $\theta 1$ of the timing of the position (line) in which the tracking-target object H is present in the captured image, the relative position relation between the position of the tracking-target object H in the image and the mount angular position $\theta 1$ can be precisely perceived (without errors caused by time lag) in the case of image capturing of the rolling shutter style.

In the embodiment, it is assumed that the position information of the tracking-target object H is information of a gravity center position based on a shape of the tracking-target object H in the captured image.

More specifically, in the captured image, the tracking-target object H is captured in a range across a plurality of pixels. Therefore, the gravity center position of this pixel range, in other words, the captured shape of the tracking-target object H is obtained and used as the position information of the tracking-target object H.

By virtue of this, as the position in the captured image of the tracking-target object H, the position of one pixel corresponding to the gravity center can be specified as a representative position. Since the position is particularly at the gravity center position, this position is the position which is approximately the center of the tracking-target object H in the captured image, and this is suitable as the representative position of the tracking-target object H about tracking control in which the range of the shape of the tracking-target object H in the captured image is to be captured.

Then, the position information in the captured image as the gravity center position which is approximately at the center position of the tracking-target object H and, as the mount angular position $\theta 1$ of the exposure timing of the gravity center position, the relative position relation between the representative position of the tracking-target object H and the mount angular position $\theta 1$ is precisely perceived. As a result, highly accurate tracking control can be carried out by the control which uses the one position (gravity center position) and has low processing load.

In the embodiment, the mount angular position $\theta 1$ (image-capturing-direction information) is assumed to be the information of the image capturing direction based on the time of exposure start and exposure end of the particular line (see FIG. 5B).

More specifically, as the information of the particular time within the time from the exposure start to the exposure end of the particular line in which the tracking-target object H is captured in the captured image, the information of the image capturing direction acquired at the timing defined by the horizontal synchronization signal is configured to be used in the drive control for tracking.

Since the mount angular position $\theta 1$ of the actual exposure timing of the particular line, in which the tracking-target object H is present in the captured image, is obtained, the image-capturing-direction information suitable for a case of image capturing of the rolling shutter style can be acquired.

In the embodiment, the mount angular position θ1 (image-capturing-direction information) is assumed to be the information of the image capturing direction of intermediate time of exposure start time and exposure end time of the particular line (see FIG. 5B).

The time which is intermediate between start and end of the exposure in the particular line LS, in which the tracking-target object H is present in the captured image, is appropriate as the representative time at which the tracking-target object H is at the position of the particular line in the captured image.

By virtue of this, the time at which the tracking-target object H has been present at the position corresponding to the particular line in the captured image can be narrowed down, and the image-capturing-direction position (mount angular position θ1) corresponding to that can be acquired.

The first embodiment has described an example in which the drive control unit 23 controls the drive amount in the image capturing direction for tracking the tracking-target object H by using the position information of the tracking-target object H acquired from the captured image and the mount angular position θ1 (image-capturing-direction information) of the timing corresponding to the position information (see FIG. 7).

The mount angular position θ1 of the timing corresponding to the position information of the tracking-target object H has high accuracy as the image-capturing-direction information of the case in which the tracking-target object H is captured in the captured image. Therefore, if the position information of the tracking-target object H and the mount angular position θ1 is used, the drive amount to be controlled can be accurately obtained as the difference thereof. Therefore, highly accurate tracking control can be carried out.

The second embodiment has described an example in which the drive control unit 23 controls the drive amount in the image capturing direction for tracking the tracking-target object H by using the position information of the tracking-target object H acquired from the captured image, the mount angular position θ1 of the timing (time t1) corresponding to the position information, and the mount angular position θ2 acquired at the drive control timing (time t2) of the image capturing direction which is after acquisition of the captured image (see FIG. 9).

The time t2, which is the drive control timing, is, for example, the timing at which the drive amount is ordered after exposure of the captured image, acquisition of a frame as an exposed image, and completion of analysis thereof. Then, the mount angular position θ1 of the timing corresponding to the position information of the tracking-target object H in the captured image is already past image capturing direction information at the drive control timing. Therefore, the difference (the drive amount to be controlled (including the drive direction expressed by positive/negative)) at a past point of time can be obtained without a time lag if the position information of the tracking-target object H and the mount angular position θ1 are used. However, at the point of time of control, displacement (change in the image capturing direction or movement of the tracking-target object H) may have already caused. Therefore, the mount angular position θ2 acquired at the drive control timing is also used.

As a result of this, the drive control using the difference Δθ2, which has been obtained by correcting the obtained difference (Δθ1: the drive direction and amount to be controlled) in consideration of the present mount angular position θ2 can be carried out. Therefore, even in a case where the image capturing direction is changed at high speed by the mount 1, a case where movement of the tracking-target object H is fast, etc., highly accurate tracking control can be carried out.

The third and fourth embodiments have described examples in which the drive control unit 23 controls the drive amount in the image capturing direction for tracking the tracking-target object by using first position information of the tracking-target object H corresponding to first timing, first image-capturing-direction information corresponding to the first position information, second position information of the tracking-target object H corresponding to second timing different from the first timing, second image-capturing-direction information corresponding to the second position information, and image-capturing-direction information acquired at drive control timing in the image capturing direction.

More specifically, the drive control unit 23 controls the drive amount in the image capturing direction for tracking the tracking-target object H by using the first position information of the tracking-target object H acquired from the past captured image, the first mount angular position θ0 corresponding to the timing (time t0: first timing) corresponding to the first position information, the second position information of the tracking-target object H acquired from the latest captured image, the second mount angular position θ1 corresponding to the timing (time t1: second timing) corresponding to the second position information, and the mount angular position θ2 acquired at the drive control timing (time t2) of the image capturing direction which is after acquisition of the captured image (see FIG. 11, FIG. 14).

The position of the tracking-target object H at a certain past point of time (time t0) can be found out from the position information and the mount angular position θ0 about the captured image of a past frame. Also, the position of the tracking-target object H at a point of time (time t1) close to the present can be found out from the position information and the mount angular position θ1 about the latest captured image. As a result, the position of the tracking-target object H of the drive control timing can be predicted.

In addition to adding correction in consideration of the mount angular position θ2 of the drive control timing, the present position of the tracking-target object H is predicted from the positions of the tracking-target object H of a plurality of points of time and is reflected to the drive amount. By doing this, the obtained difference (the drive direction and amount to be controlled) can be subjected to correction in consideration of the present mount angular position and correction reflecting the predicted position of the present tracking-target object H, and further accurate tracking control can be carried out. Particularly, this is suitable for a case where the image capturing direction is changed at high speed by the mount 1, a case where movement of the tracking-target object H is fast, etc.

The embodiment has described an example in which the drive control unit 23 controls the drive amount in the image capturing direction so that a tracking-target object H is positioned near a center in a captured image.

The drive control for tracking changes the image capturing direction so that the tracking-target object H is always positioned near the center of the captured image.

As a result, tracking which appropriately captures the tracking-target object H is carried out. Specifically, the tracking precisely capturing the tracking-target object is realized by controlling the drive amount so that the difference in the position of the tracking-target object H in the captured image with respect to the image-capturing-direction information, which is a front side of the image capturing device 10, becomes zero.

Note that positioning the tracking-target object H in a vicinity of the center is an example. In the present technology, it is also possible to control the drive amount in the image capturing direction so that the tracking-target object H is positioned at an arbitrary location other than the vicinity of the center in the captured image as a particular layout. In this case, the drive amount is only required to be controlled so as to cause the difference between an arbitrary position in the captured image and the position of the tracking-target object H in the captured image to be zero.

The fifth embodiment includes an example in which the object information and the image-capturing-direction information is information based on the captured image acquired from a first image capturing device, and the drive control unit 23 controls the drive amount in the image capturing direction for tracking the object on the basis of parallax information of the first image capturing device and a second image capturing device different from the first image capturing device. Specifically, in a case where the tracking image-capturing device 10A (first image capturing device) for detecting the tracking-target object H and the image capturing device 10 (second image capturing device) for recorded images are controlled in the same image capturing direction, the drive control unit 23 controls the drive amount in the image capturing direction for tracking the tracking-target object H by using the position information of the tracking-target object H acquired from the captured image of the tracking image-capturing device 10A, the mount angular position $\theta 1$ of the timing corresponding to the position information, and parallax information of the tracking image-capturing device 10A and the image capturing device 10 for recorded images.

By virtue of this, in a case where the tracking image-capturing device 10A is used, tracking can be carried out without the influence of parallax between the image capturing device 10 (image capturing device for recorded images) and the tracking image-capturing device 10A. Therefore, even in a system in which the tracking image-capturing device 10A and the image capturing device 10 for recording are different, control can be realized so that tracking target is positioned at a desired position in video for recording.

For example, detecting a tracking-target object by carrying out high-frame-rate image capturing is carried out in a tracking image-capturing device in order to track an object which moves fast, and inconvenience caused by parallax in such a case can be eliminated.

As shown in FIG. 4, the drive control unit 23 of the embodiment includes a tracking-target acquisition unit 41 configured to extract a position and a shape of a tracking-target object H in the captured image, a gravity-center-position computation unit 42 configured to obtain a gravity center position on the basis of the position and the shape of the tracking-target object H and determine a particular line, a representative-time acquisition unit 43 configured to acquire time at which the particular line is subjected to exposure and determine representative time, an image-capturing-direction acquisition unit 44 configured to acquire mount angular position $\theta 1$ (image-capturing-direction information) of the representative time, and a drive-amount computation unit 45 configured to obtain the drive amount in the image capturing direction for tracking the tracking-target object H by using the image-capturing-direction information of the representative time and the gravity center position of the tracking-target object.

By virtue of this configuration, the mount angular position $\theta 1$ and the position (gravity center position) of the tracking-target object at the timing (time t1) of the representative time are obtained so that the deviation used in tracking control is obtained in a state free from a shift in terms of the temporal axis.

The exposure time of the line of the gravity center position of the tracking-target object H is determined, and the mount angular position $\theta 1$ of that point of time is configured to be obtained. As a result, the mount angular position $\theta 1$ corresponding to the exposure timing of the representative position of the tracking-target object H in the image can be precisely obtained. Therefore, the deviation required for control can be obtained, the drive amount that eliminates the deviation can be obtained, and highly accurate tracking control is realized.

The embodiment has described an example of, as image-capturing-direction information, angular position information of a mount 1 configured to change the image capturing direction of an image capturing device 10.

By virtue of this, in tracking using the mount 1, the above described technology is applied, and highly accurate tracking is enabled. Particularly, this is suitable for a case where tracking of a high-speed object is executed by using the mount 1.

The technology of the present disclosure is not limited to the examples of the embodiment, and various modification examples are conceivable.

In FIGS. 5A and 5B, three horizontal synchronization periods are taken as an example as the exposure time of one line. However, as a matter of course, this is an example, and shorter exposure periods and longer exposure periods are also possible. In other words, the shutter speed which can be set is various.

Herein, the representative time tr is not necessarily selected at the center timing of the exposure period. For example, if the exposure period (shutter speed) is long, using a vicinity of the exposure end time is desirable in some cases since the time lag from the control timing is reduced.

A program of the embodiment is a program configured to cause an information processing device to execute processing of controlling a drive amount in an image capturing direction for tracking an object on the basis of object information acquired from a captured image and image-capturing-direction information corresponding to a horizontal synchronization signal used in an image capturing action.

More specifically, the program causes the information processing device to execute the processing of FIG. 7, FIG. 9, FIG. 11, and FIG. 14.

By virtue of such a program, realization of the drive control device of the present embodiment is facilitated.

Then, such a program can be stored in advance in a recording medium built in equipment such as a computer device, a ROM in a microcomputer having a CPU, etc. Alternatively, the program can be also temporarily or permanently stored (memorized) in a removable recording medium such as a semiconductor memory, a memory card, an optical disk, a magnetooptical disk, or a magnetic disk.

Also, such a removable recording medium can be provided as so-called packaged software.

Also, such a program can be downloaded from a download site via a network such as a LAN or the Internet other than installation from the removable recording medium to a personal computer or the like.

Note that the effects described in the present specification are merely examples and are not limitative, and other effects may be exerted.

Note that the present technology can also employ following configurations.

(1)

A drive control device including
a drive control unit configured to control a drive amount in an image capturing direction for tracking an object on the basis of object information acquired from a captured image and image-capturing-direction information corresponding to a horizontal synchronization signal used in an image capturing action.

(2)

The drive control device according to above described (1), in which
the object information includes position information of a tracking-target object in a captured image.

(3)

The drive control device according to above described (1) or (2), in which
the image-capturing-direction information is information of an image capturing direction acquired on the basis of a horizontal synchronization signal of a particular line corresponding to position information of a tracking-target object included in the object information among a line of an image signal of the captured image.

(4)

The drive control device according to above described (2), in which
the position information of the tracking-target object is information of a gravity center position based on a shape of a tracking-target object in a captured image.

(5)

The drive control device according to above described (4), in which
the image-capturing-direction information is information of an image capturing direction based on time of exposure start and exposure end of a particular line corresponding to the position information included in the object information among a line of an image signal of the captured image.

(6)

The drive control device according to above described (5), in which
the image-capturing-direction information is information of an image capturing direction of intermediate time of exposure start time and exposure end time of the particular line.

(7)

The drive control device according to any of above described (1) to (6), in which
the object information includes position information of a tracking-target object acquired from a captured image, and
the drive control unit controls a drive amount in an image capturing direction for tracking the tracking-target object on the basis of
the position information and
image-capturing-direction information corresponding to the position information.

(8)

The drive control device according to any of above described (1) to (6), in which
the object information includes position information of a tracking-target object acquired from a captured image, and
the drive control unit controls a drive amount in an image capturing direction for tracking the tracking-target object on the basis of
the position information,
image-capturing-direction information corresponding to the position information, and
image-capturing-direction information corresponding to drive control in the image capturing direction.

(9)

The drive control device according to any of above described (1) to (6), in which
the object information includes position information of a tracking-target object acquired from a captured image, and
the drive control unit controls a drive amount in an image capturing direction for tracking the tracking-target object by using
first position information of the tracking-target object corresponding to first timing,
first image-capturing-direction information corresponding to the first position information,
second position information of the tracking-target object corresponding to second timing different from the first timing,
second image-capturing-direction information corresponding to the second position information, and
image-capturing-direction information acquired at drive control timing in the image capturing direction.

(10)

The drive control device according to above described (9), in which
the first timing is past timing of the second timing.

(11)

The drive control device according to any of above described (1) to (9), in which
the drive control unit
controls a drive amount in an image capturing direction so that a tracking-target object is positioned near a center in a captured image.

(12)

The drive control device according to any of above described (1) to (11), in which
the object information and the image-capturing-direction information is information based on a captured image acquired from a first image capturing device, and
the drive control unit
controls a drive amount in an image capturing direction for tracking an object on the basis of parallax information of the first image capturing device and a second image capturing device different from the first image capturing device.

(13)

The drive control device according to any of above described (1) to (12), in which
the drive control unit includes
a tracking-target acquisition unit configured to extract a position and a shape of a tracking-target object in a captured image,
a gravity-center-position computation unit configured to determine a particular line corresponding to a gravity center position based on the position and the shape of the tracking-target object from among a line of an image signal of the captured image, a representative-time acquisition unit configured to acquire time at which the particular line is subjected to exposure and determine representative time, an image-capturing-direction acquisition unit configured to acquire image-capturing-direction information of the representative time, and a drive-amount computation unit configured to obtain a drive amount in an image capturing direction for tracking the tracking-target object by using the image-capturing-direction information and the gravity center position.

(14)

The drive control device according to any of above described (1) to (13), in which image-capturing-direction information is angular position information of a mount configured to change an image capturing direction of an image capturing device.

(15)

A drive control method, in which an information processing device controls a drive amount in an image capturing direction for tracking an object on the basis of object information acquired from a captured image and image-capturing-direction information corresponding to a horizontal synchronization signal used in an image capturing action.

(16)

A program configured to cause an information processing device to execute processing of controlling a drive amount in an image capturing direction for tracking an object on the basis of object information acquired from a captured image and image-capturing-direction information corresponding to a horizontal synchronization signal used in an image capturing action.

REFERENCE SIGNS LIST

1 Mount
2 Turning shaft part
3 Turning shaft part
4 Base part
5 Attachment part
6 Arm part
10 Image capturing device
10A Tracking image-capturing device
11 Movable unit
12 Tracking control device
21 Imager
22 Image acquisition unit
23 Drive control unit
24 Synchronization-signal generation unit
25 Mount-position-information acquisition unit
26 Motor control unit
27 Motor driver
28 Mount position sensor
29 Actuator
41 Tracking-target acquisition unit
42 Gravity-center-position computation unit
43 Representative-time acquisition unit
44 Image-capturing-direction acquisition unit
45 Drive-amount computation unit

The invention claimed is:

1. A drive control device, comprising:
processor configured to:
acquire object information from a first captured image, wherein the object information includes position information of a tracking-target object in the first captured image;
acquire first image-capturing-direction information based on a horizontal synchronization signal of a particular line of a plurality of lines of an image signal of the first captured image, wherein
the particular line corresponds to the position information of the tracking-target object, and
the first image-capturing-direction information includes information of an image capturing direction; and
control, based on the object information and the first image-capturing-direction information, a drive amount in the image capturing direction to track the tracking-target.

2. The drive control device according to claim 1, wherein the position information of the tracking-target object includes information of a gravity center position based on a shape of the tracking-target object in the first captured image.

3. The drive control device according to claim 2, wherein the first image-capturing-direction information includes the information of the image capturing direction based on an exposure start time and an exposure end time of the particular line.

4. The drive control device according to claim 3, wherein the first image-capturing-direction information includes the information of the image capturing direction of an intermediate time of the exposure start time and the exposure end time of the particular line.

5. The drive control device according to claim 1, wherein the processor is further configured to control the drive amount in the image capturing direction based on the position information and second image-capturing-direction information corresponding to the position information.

6. The drive control device according to claim 1, wherein the processor is further configured to control the drive amount in the image capturing direction based on the position information, second image-capturing-direction information corresponding to the position information, and third image-capturing-direction information corresponding to drive control in the image capturing direction.

7. The drive control device according to claim 1, wherein the processor is further configured to control the drive amount in the image capturing direction based on
first position information of the tracking-target object corresponding to a first timing,
second image-capturing-direction information corresponding to the first position information,
second position information of the tracking-target object corresponding to a second timing different from the first timing,
third image-capturing-direction information corresponding to the second position information, and
fourth image-capturing-direction information acquired at a drive control timing in the image capturing direction.

8. The drive control device according to claim 7, wherein the first timing is a past timing of the second timing.

9. The drive control device according to claim 1, wherein the processor is further configured to control the drive amount in the image capturing direction so that the tracking-target object is positioned near a center in a second captured image.

10. The drive control device according to claim 1, wherein the object information and the first image-capturing-direction information are based on a second captured image acquired from a first image capturing device, and the processor is further configured to control the drive amount in the image capturing direction based on first parallax information of the first image capturing device and second parallax information of a second image capturing device different from the first image capturing device.

11. The drive control device according to claim 1, wherein the processor is further configured to:
   extract a position and a shape of the tracking-target object in the first captured image;
   determine the particular line corresponding to a gravity center position based on the position and the shape of the tracking-target object;
   acquire a time at which the particular line is subjected to exposure;
   determine a representative time based on the acquired time;
   acquire the first image-capturing-direction information of the representative time; and
   obtain the drive amount in the image capturing direction based on the first image-capturing-direction information and the gravity center position.

12. The drive control device according to claim 1, wherein the first image-capturing-direction information further includes angular position information of a mount configured to change the image capturing direction of an image capturing device.

13. A drive control method, comprising: in an information processing device:
   acquiring object information from a captured image,
      wherein the object information includes position information of a tracking-target object in the captured image;
   acquiring image-capturing-direction information based on a horizontal synchronization signal of a particular line of a plurality of lines of an image signal of the captured image, wherein
      the particular line corresponds to the position information of the tracking-target object, and
      the image-capturing-direction information includes information of an image capturing direction; and
   controlling, based on the object information and the image-capturing-direction information, a drive amount in the image capturing direction for tracking the tracking-target object.

14. A non-transitory computer-readable medium having stored thereon computer-executable instructions that, when executed by a processor, cause the processor to execute operations, the operations comprising:
   acquiring object information from a captured image,
      wherein the object information includes position information of a tracking-target object in the captured image;
   acquiring image-capturing-direction information based on a horizontal synchronization signal of a particular line of a plurality of lines of an image signal of the captured image, wherein
      the particular line corresponds to the position information of the tracking-target object, and
      the image-capturing-direction information includes information of an image capturing direction; and
   controlling, based on the object information and the image-capturing-direction information, a drive amount in the image capturing direction for tracking the tracking-target object.

15. A drive control device, comprising:
   a processor configured to:
      acquire object information from a captured image, wherein
         the object information includes position information of a tracking-target object in the captured image, and
         the position information of the tracking-target object includes information of a gravity center position based on a shape of the tracking-target object in the captured image;
      acquire image-capturing-direction information corresponding to a horizontal synchronization signal, wherein
         the image-capturing-direction information includes information of an image capturing direction based on an exposure start time and an exposure end time of a particular line of a plurality of lines of an image signal of the captured image, and
         the particular line corresponds to the position information of the tracking-target object; and
      control, based on the object information and the image-capturing-direction information, a drive amount in the image capturing direction to track the tracking-target object.

* * * * *